(12) United States Patent
Chatterjee et al.

(10) Patent No.: US 11,716,225 B2
(45) Date of Patent: *Aug. 1, 2023

(54) TIME DOMAIN RESOURCE ALLOCATION FOR MOBILE COMMUNICATION

(71) Applicant: Apple Inc., Cupertino, CA (US)

(72) Inventors: Debdeep Chatterjee, San Jose, CA (US); Sergey Panteleev, Nizhny Novgorod NIZ (RU); Gang Xiong, Portland, OR (US); Ajit Nimbalker, Fremont, CA (US); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,556

(22) Filed: May 28, 2021

(65) Prior Publication Data

US 2021/0288842 A1  Sep. 16, 2021

Related U.S. Application Data

(63) Continuation of application No. 16/246,407, filed on Jan. 11, 2019, now Pat. No. 11,025,456.

(Continued)

(51) Int. Cl.
*H04W 76/27* (2018.01)
*H04L 25/02* (2006.01)
(Continued)

(52) U.S. Cl.
CPC ........ *H04L 25/0226* (2013.01); *H04L 5/0048* (2013.01); *H04L 5/0094* (2013.01);
(Continued)

(58) Field of Classification Search
CPC . H04L 25/0226; H04L 5/0048; H04L 5/0094; H04L 5/0046; H04L 5/0044;
(Continued)

(56) References Cited

U.S. PATENT DOCUMENTS

2019/0149365 A1   5/2019 Chatterjee et al.
2019/0150142 A1 * 5/2019 Huang ............... H04L 5/0094
                                                           370/336
(Continued)

OTHER PUBLICATIONS

3GPP214 (3GPP TS 38.214 v1.3.0, NR, Physical layer procedures for data, Dec. 2017).*

(Continued)

*Primary Examiner* — Lakeram Jangbahadur
(74) *Attorney, Agent, or Firm* — Sterne, Kessler, Goldstein & Fox P.L.L.C.

(57) ABSTRACT

Systems, apparatuses, methods, and computer-readable media are provided for time domain resource allocations in wireless communications systems. Disclosed embodiments include time-domain symbol determination and/or indication using a combination of higher layer and downlink control information signaling for physical downlink shared channel and physical uplink shared channel; time domain resource allocations for mini-slot operations; rules for postponing and dropping for multiple mini-slot transmission; and collision handling of sounding reference signals with semi-statically or semi-persistently configured uplink transmissions. Other embodiments may be described and/or claimed.

20 Claims, 11 Drawing Sheets

Related U.S. Application Data

(60) Provisional application No. 62/620,185, filed on Jan. 22, 2018, provisional application No. 62/618,477, filed on Jan. 17, 2018, provisional application No. 62/617,106, filed on Jan. 12, 2018.

(51) Int. Cl.
| | |
|---|---|
| *H04L 5/00* | (2006.01) |
| *H04W 76/11* | (2018.01) |
| *H04W 80/02* | (2009.01) |
| *H04W 72/1273* | (2023.01) |
| *H04W 72/0446* | (2023.01) |
| *H04W 72/23* | (2023.01) |

(52) U.S. Cl.
CPC ........ *H04W 72/1273* (2013.01); *H04W 76/11* (2018.02); *H04W 76/27* (2018.02); *H04W 80/02* (2013.01); *H04W 72/0446* (2013.01); *H04W 72/23* (2023.01)

(58) Field of Classification Search
CPC . H04L 5/0092; H04W 72/1273; H04W 76/11; H04W 76/27; H04W 80/02; H04W 72/042; H04W 72/0446; H04W 72/1289
See application file for complete search history.

(56) References Cited

U.S. PATENT DOCUMENTS

| | | | |
|---|---|---|---|
| 2019/0158205 A1* | 5/2019 | Sheng | .................. H04B 7/0626 |
| 2019/0159213 A1* | 5/2019 | Baldemair | ........ H04W 72/0493 |
| 2019/0200355 A1 | 6/2019 | Baldemair et al. | |

OTHER PUBLICATIONS

3GPP211 (3GPP TS 38.211 v15.0.0, NR; Physical channels and modulation, Dec. 2017).*

3GPP, "Technical Specification Group Radio Access Network; NR; Physical layer procedures for data (Release 15)," 3GPP TS 38.214 V15.0.0 (Dec. 2017), 5G, 71 pages.

3GPP, "Technical Specification Group Radio Access Network; NR; Physical layer procedures for data (Release 15)," 3GPP TS 38.214 V1.3.0 (Dec. 2017), R1-1721344, 5G, 71 pages.

3GPP, "Technical Specification Group Radio Access Network; NR; Physical channels and modulation (Release 15)," 3GPP TS 38.211 V15.0.0 (Dec. 2017), 5G, 73 pages.

3GPP, "RAN1 Chairman's Notes," 3GPP TSG RAN WG1 Meeting 91, Nov. 27-Dec. 1, 2017, Reno, USA, 179 pages.

3GPP, "Technical Specification Group Radio Access Network; NR; Multiplexing and channel coding (Release 15)," 3GPP TS 38.212 V15.0.0 (Dec. 2017), 5G, 82 pages.

3GPP314, Dec. 2017, (3GPP TS 38.214 v1.3.0, NR, Physical layer procedures for data).

3GPP211, Dec. 2017, (3GPP TS 38.211 v15.0.0, NR; Physical channels and modulation).

* cited by examiner

TIME DOMAIN RESOURCE ALLOCATION FOR MOBILE COMMUNICATION

RELATED APPLICATIONS

The present application is a continuation of U.S. application Ser. No. 16/246,407, filed Jan. 11, 2019, now I.S. Pat. No. 11,025,456, which claims the benefit of U.S. Provisional App. No. 62/617,106, filed Jan. 12, 2018, U.S. Provisional App. No. 62/618,477 filed Jan. 17, 2018, and U.S. Provisional App. No. 62/620,185, filed Jan. 22, 2018, each of which are hereby incorporated by reference in its entirety.

FIELD

The present application generally relates to the field of wireless communications, and in particular, to time domain resource allocation for cellular communications.

BACKGROUND

Mobile communication has evolved significantly from early voice systems to today's highly sophisticated integrated communication platform. The next generation wireless communication systems, 5G or NR, provide access to information and sharing of data anywhere, anytime by various users and applications. In general, NR is an evolution of the wireless connectivity solutions of 3GPP LTE-Advanced. NR is meant to enable everything connected by wireless and deliver fast, rich content and services. NR is expected to be a unified network/system that is targeted to meet vastly different and sometimes conflicting performance dimensions and services. Such diverse multi-dimensional requirements are driven by different services and applications.

BRIEF DESCRIPTION OF THE FIGURES

FIG. 9 shows an example time domain table configuration process and an allocation table building process according to various embodiments; FIG. 10 shows an example physical shared channel slot determination process 1000 according to various embodiments; and FIG. 11 shows an example time domain allocation configuration process 1100 according to various embodiments.

DETAILED DESCRIPTION

Embodiments herein provide mechanisms for TDRA for DL and UL shared channels, for example, PDSCH and PUSCH, that may be scheduled dynamically using DCI carried by PDCCH or based on semi-static configurations, for example, DL SPS or UL transmissions without UL grant. In particular, the present disclosure discusses embodiments for indicating time-domain symbols using a combination of higher layer and DCI signaling for PDSCH and PUSCH, as well as handling of time-domain resource allocation fields and related signaling for fallback DCI formats (e.g., DCI formats 0_0 and 1_0). The present disclosure also discusses embodiments related to TDRA for mini-slot operation including embodiments related to postponing and/or dropping multi-slot and/or mini-slot transmissions. In particular, for PDSCH or PUSCH with aggregated slots wherein a transport block is repeated with the same or different redundancy versions (RVs), the present disclosure discusses embodiments related to resource mapping for multiple slots with PDSCH/PUSCH mapping type A, and for multiple mini-slots with at least lengths of 2, 4, 7 symbols with PDSCH/PUSCH mapping type B. The present disclosure also discusses embodiments related to conflict resolution for link direction conflicts or collisions between physical channels. In particular, embodiments include collision handling of SRS with semi-statically or semi-persistently configured UL transmission. Other embodiments may be described and/or claimed.

Figure 1:
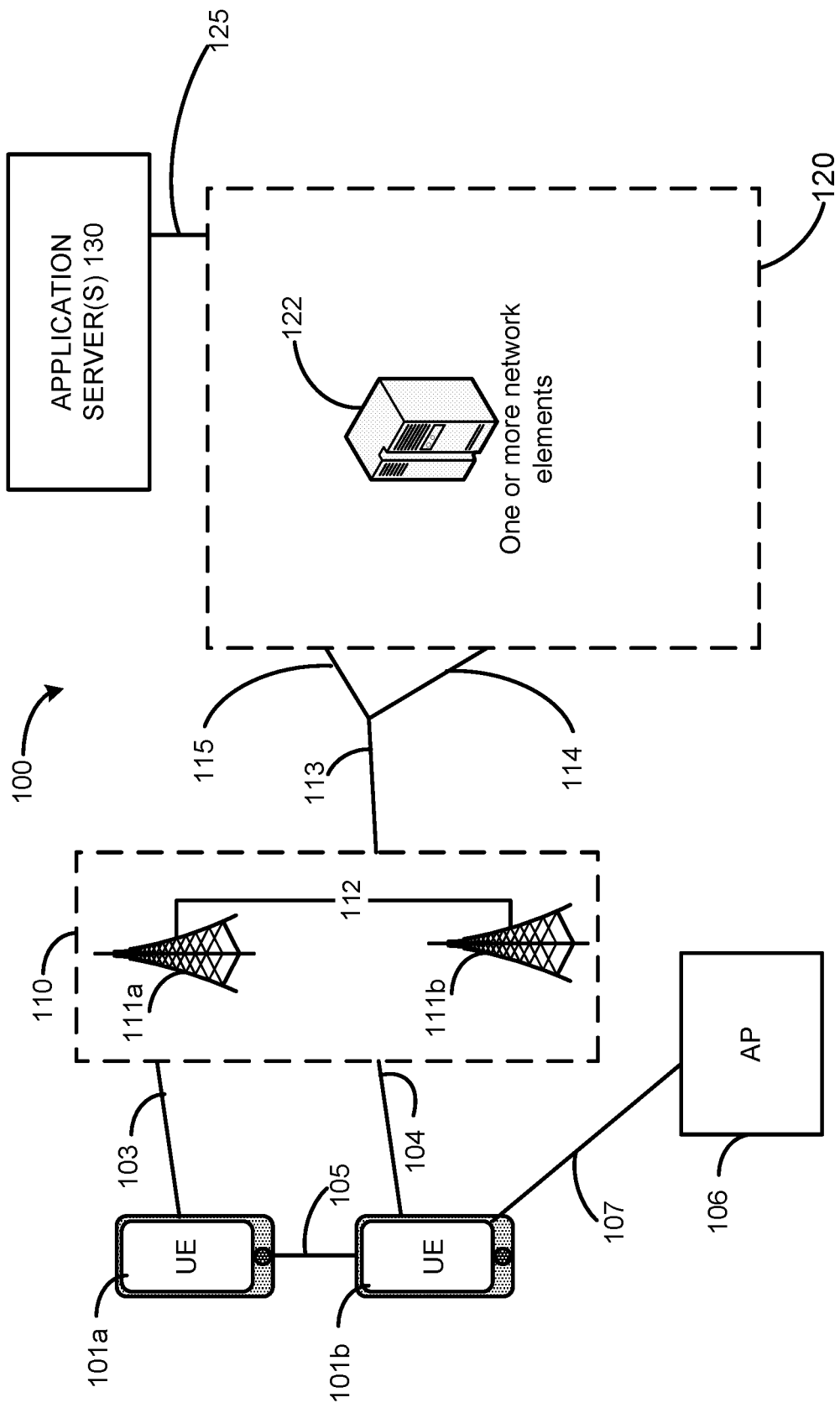
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like. As discussed in more detail infra, the UEs 101 incorporate the time domain resource allocation embodiments discussed herein. In these embodiments, the UEs 101 are capable of determining symbols for time domain resource allocation(s) based on a combination of higher layer and downlink control information signaling for PDSCH and/or PUSCH; time domain resource allocation(s) for mini-slot operations; rules for postponing and dropping for multiple mini-slot transmissions; and collision handling of SRSs with semi-statically or semi-persistently configured UL transmissions.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. As used herein, the term "NG RAN" or the like refers to a RAN 110 that operates in an NR or 5G system 100, and the term "E-UTRAN" or the like refers to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a WiFi® router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like refers to a RAN node 111 that operates in an NR or 5G system 100 (e.g., a gNB), and the term "E-UTRAN node" or the like refers to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 may be or act as RSUs. The term "Road Side Unit" or "RSU" refers to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The PDSCH carries user data and higher-layer signaling to the UEs 101. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH can be used to schedule DL transmissions on PDSCH and UL transmissions on PUSCH, where the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs; switching an active BWP for a UE 101; and initiating a random access procedure.

The PDCCH uses CCEs to convey the control information. Control channels are formed by aggregation of one or more CCEs, where different code rates for the control channels are realized by aggregating different numbers of CCEs. Before being mapped to resource elements, the PDCCH complex-valued symbols may first be organized into quadruplets, which may then be permuted using a sub-block interleaver for rate matching. Each PDCCH is transmitted using one or more of these CCEs, where each CCE may correspond to nine sets of four physical resource elements known as REGs. Four QPSK symbols may be mapped to each REG. The PDCCH can be transmitted using one or more CCEs, depending on the size of the DCI and the channel condition. For example, there can be four or more different PDCCH formats defined in LTE with different numbers of CCEs (e.g., aggregation level, L=1, 2, 4, or 8).

The UEs 101 monitor (or attempt to decode) respective sets of PDCCH candidates in one or more configured monitoring occasions according to the corresponding search space configurations. In NR implementations, the UEs 101 monitor (or attempt to decode) respective sets of PDCCH candidates in one or more configured monitoring occasions in one or more configured CORESETs according to the corresponding search space configurations. A CORESET includes a set of PRBs with a time duration of 1 to 3 OFDM symbols. The REGs and CCEs are defined within a CORESET with each CCE including a set of REGs. Interleaved and non-interleaved CCE-to-REG mapping are supported in a CORESET. Each REG carrying PDCCH carries its own DMRS.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The UEs 101, upon detection of a PDCCH with a configured DCI (e.g., DCI format 1_0, DC format 1_1, or some new DC format) decode the corresponding PDSCHs as indicated by that DCI. A closed loop DMRS based spatial multiplexing is supported for PDSCH where up to 8 and 12 orthogonal DL DMRS ports are supported for type 1 and type 2 DMRS respectively. The UEs 101 may assume that at least one symbol with a DMRS is present on each layer in which a PDSCH is transmitted to a UE 101, and up to three additional DMRSs can be configured by higher layers. The DMRS and corresponding PDSCH are transmitted using the same precoding matrix and the UEs 101 do not need to know the precoding matrix to demodulate the transmission. The transmitter (e.g., RAN node 111) may use different precoder matrix for different parts of the transmission bandwidth, resulting in frequency selective precoding. The UEs 101 may also assume that the same precoding matrix is used across a set of PRBs denoted PRG.

When the UE 101 is scheduled to receive PDSCH by a DCI (e.g., DCI format 1_0, DCI format 1_1, or a new DCI format), a time domain resource assignment field value m of the DCI provides a row index m+1 to an allocation table. Depending on the DCI format, the time domain resource assignment field maybe 4 bits, and in some cases, the bitwidth for this field is determined as $\lceil \log_2(I) \rceil$ bits, where I is the number of entries in the higher layer parameter pdsch-TimeDomainAllocationList. The indexed row defines a slot offset $K_0$, a start and length indicator SLIV (or directly the start symbol S and the allocation length L), and a PDSCH mapping type to be assumed in a PDSCH reception.

Given the parameter values of the indexed row the slot allocated for the PDSCH is $$\left\lfloor n \cdot \frac{2^{\mu_{PDSCH}}}{2^{\mu_{PDCCH}}} \right\rfloor + K_0,$$

where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively. The starting symbol S relative to the start of the slot, and the number of consecutive symbols L counting from the symbol S allocated for the PDSCH are determined from the start and length indicator SLIV: if $(L-1) \leq 7$ then SLIV=14·(L−1)+S, else SLIV=14·(14−L+1)+(14−1−S), where $0 < L \leq 14-S$. The PDSCH mapping type is set to Type A or Type B is given by the index row. The PDSCH mapping type (e.g., Type A or Type B) is related to the location/position of the corresponding DMRS in the slot. For PDSCH mapping type A, a time domain symbol for the DMRS is defined relative to the start of the slot, whereas for PDSCH mapping type B the time domain symbol for the DMRS is defined relative to the starting symbol.

According to various embodiments, the UE 101 may consider the S and L combinations defined in table 1 as valid PDSCH allocations.

When the UE is configured with aggregationFactorDL>1, the same symbol allocation is applied across the aggregationFactorDL consecutive slots. The UE may expect that the TB is repeated within each symbol allocation among each of the aggregationFactorDL consecutive slots and the PDSCH is limited to a single transmission layer. The redundancy version to be applied on the $n^{th}$ transmission occasion of the TB is determined according to table 2.

TABLE 2

Applied redundancy version when aggregationFactorDL > 1

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

If the UE 101 procedure for determining slot configuration determines symbol of a slot allocated for PDSCH as uplink symbols, the transmission on that slot is omitted for multi-slot PDSCH transmission. The UE 101 is not expected to receive a PDSCH with mapping type A in a slot, if the PDCCH scheduling the PDSCH was received in the same slot and was not contained within the first three symbols of the slot. The UE 10 is not expected to receive a PDSCH with mapping type B in a slot, if the first symbol of the PDCCH scheduling the PDSCH was received in a later symbol than the first symbol indicated in the PDSCH time domain resource allocation.

Table 3 defines which PDSCH time domain resource allocation configuration to apply. Either a default PDSCH time domain allocation A, B or C according to tables 4, 5, 6, and 7 is applied, or the higher layer configured pdsch-TimeDomainAllocationList in either pdsch-ConfigCommon or pdsch-Config is applied.

TABLE 1

Valid S and L combinations

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note
1: S = 3 is applicable only if dmrs-TypeA-Posiition = 3

TABLE 3

Applicable PDSCH time domain resource allocation

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0 common | 1 | — | — | Default A for normal CP |
|  |  | 2 | — | — | Default B |
|  |  | 3 | — | — | Default C |
| SI-RNTI | Type0A common | 1 | No | — | Default A |
|  |  | 2 | No | — | Default B |
|  |  | 3 | No | — | Default C |
|  |  | 1, 2, 3 | Yes | — | pdsch-TimeDomainAllocationList provided in pdsch-ConfigCommon |
| RA-RNTI, TC-RNTI | Type1 common | 1, 2, 3 | No | — | Default A |
|  |  | 1, 2, 3 | Yes | — | pdsch-TimeDomainAllocationList provided in pdsch-ConfigCommon |
| P-RNTI | Type2 common | 1 | No | — | Default A |
|  |  | 2 | No | — | Default B |
|  |  | 3 | No | — | Default C |
|  |  | 1, 2, 3 | Yes | — | pdsch-TimeDomainAllocationList provided in pdsch-ConfigCommon |
| C-RNTIMCS-C-RNTI, CS-RNTI | Any common search space associated with CORESET# 0 | 1, 2, 3 | No | — | Default A |
|  |  | 1, 2, 3 | Yes | — | pdsch-TimeDomainAllocationList provided in pdsch-ConfigCommon |
| C-RNTI, MCS-C-RNTI, CS-RNTI | Any common search space not associated with CORESET# 0 | 1, 2, 3 | No | No | Default A |
|  |  | 1, 2, 3 | Yes | No | pdsch-TimeDomainAllocationList provided in pdsch-ConfigCommon |
|  | UE specific search space | 1, 2, 3 | No/Yes | Yes | pdsch-TimeDomainAllocationList provided in pdsch-Config |

TABLE 4

Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 5

Default PDSCH time domain resource allocation A for extended CP

| Row index | dmrs-TypeA-Position | PDSCH mapping type | $K_0$ | S | L |
|---|---|---|---|---|---|
| 1 | 2 | Type A | 0 | 2 | 6 |
|  | 3 | Type A | 0 | 3 | 5 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 6 | 4 |
|  | 3 | Type B | 0 | 8 | 2 |
| 7 | 2 | Type B | 0 | 4 | 4 |
|  | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 6

Default PDSCH time domain resource allocation B

| Row index | dmrs-TypeA-Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 | 2, 3 | Type B | 1 | 2 | 4 |
| 16 |  | Reserved |  |  |  |

Note 1:
If the PDSCH was scheduled with SI-RNTI in PDCCH Type0 common search space, the UE may assume that this PDSCH resource allocation is not applied

TABLE 7

Default PDSCH time domain resource allocation C

| Row index | dmrs-TypeA-Position | PDSCH mapping type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |  | Reserved |  |  |  |
| 7 |  | Reserved |  |  |  |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

Note 1:
The UE may assume that this PDSCH resource allocation is not used, if the PDSCH was scheduled with SI-RNTI in PDCCH Type0 common search space PUSCH transmission(s) can be dynamically scheduled by an UL grant in a DCI, or semi-statically configured to operate upon the reception of higher layer parameter of configuredGrantConfig including rrc-ConfiguredUplinkGrant without the detection of an UL grant in a DCI, or configuredGrantConfig not including rrc-ConfiguredUplinkGrant semi-persistently scheduled by an UL grant in a DCI after the reception of higher layer parameter configuredGrantConfig not including rrc-ConfiguredUplinkGrant.

A UE 101, upon detection of a PDCCH with a configured DCI (e.g., DCI format 0_0, DCI format 0_1, or the like), transmits the corresponding PUSCH as indicated by that DCI. For PUSCH scheduled by DCI format 0_0 on a cell, the UE 101 transmits the PUSCH according to a spatial relation corresponding to the PUCCH resource with the lowest ID within the active UL BWP of the cell.

When the UE 101 is scheduled to transmit a transport block and no CSI report, or the UE 101 is scheduled to transmit a transport block and a CSI report(s) on PUSCH by a DCI, the time domain resource assignment field value m of the DCI provides a row index m+1 to an allocated table. The indexed row defines the slot offset $K_2$, the start and length indicator SLIV, or directly the start symbol S and the allocation length L, and the PUSCH mapping type to be applied in the PUSCH transmission.

When the UE 101 is scheduled to transmit a PUSCH with no transport block and with a CSI report(s) by a CSI request field on a DCI, the Time-domain resource assignment field value m of the DCI provides a row index m+1 to an allocated table which is defined by the higher layer configured pusch-TimeDomainAllocationList in pusch-Config. The indexed row defines the start and length indicator SLIV, and the PUSCH mapping type to be applied in the PUSCH transmission and the $K_2$ value is determined as $$K_2 = \max_j Y_j(m+1),$$

where $Y_j$, j=0, ..., $N_{Rep}-1$ are the corresponding list entries of the higher layer parameter reportSlotOffsetList in CSI-ReportConfig for the $N_{Rep}$ triggered CSI Reporting Settings and $Y_j(m+1)$ is the (m+1)th entry of $Y_j$.

The slot where the UE 101 transmits the PUSCH is determined by $K_2$ as $$\left\lfloor n \cdot \frac{2^{\mu_{PUSCH}}}{2^{\mu_{PDCCH}}} \right\rfloor + K_2$$

where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively. The starting symbol S relative to the start of the slot, and the number of consecutive symbols L counting from the symbol S allocated for the PUSCH are determined from the start and length indicator SLIV of the indexed row: if $(L-1) \leq 7$ then SLIV=14·(L−1)+S, else SLIV=14·(14−L+1)+(14−1−S), where 0<L≤14−S. The PUSCH mapping type is set to Type A or Type B is given by the indexed row. The PUSCH mapping type (e.g., Type A or Type B) is related to the location/position of the corresponding DMRS in the slot. For PUSCH mapping type A, a time domain symbol for the DMRS is defined relative to the start of the slot, whereas for PUSCH mapping type B the time domain symbol for the DMRS is defined relative to the starting symbol. According to various embodiments, the UE 101 may consider the S and L combinations defined in table 8 as valid PUSCH allocations.

TABLE 8

| PUSCH mapping type | Valid S and L combinations | | | | | |
|---|---|---|---|---|---|---|
|  | Normal cyclic prefix | | | Extended cyclic prefix | | |
|  | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ... 12} | {1, ..., 12} | {1, ..., 12} |

When the UE is configured with aggregationFactorUL>1, the same symbol allocation is applied across the aggregationFactorUL consecutive slots and the PUSCH is limited to a single transmission layer. The UE 101 repeats the TB across the aggregationFactorUL consecutive slots applying the same symbol allocation in each slot. The redundancy version to be applied on the $n^{th}$ transmission occasion of the TB is determined according to table 9.

TABLE 9

Redundancy version when aggregationFactorUL > 1

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

If the UE 101 procedure for determining slot configuration determines symbols of a slot allocated for PUSCH as downlink symbols, the transmission on that slot is omitted for multi-slot PUSCH transmission.

Table 10 defines which PUSCH time domain resource allocation configuration to apply. Either a default PUSCH time domain allocation A according to table 11, is applied, or the higher layer configured pusch-TimeDomainAllocationList in either pusch-ConfigCommon or pusch-Config is applied. Table 13 defines the subcarrier spacing specific values j. j is used in determination of $K_2$ in conjunction with table 11 for normal CP or table 12 for extended CP, where $\mu_{PUSCH}$ is the subcarrier spacing configurations for PUSCH. Table 14 defines the additional subcarrier spacing specific slot delay value for the first transmission of for MSG3 scheduled by the RAR. When the UE transmits a MSG3 scheduled by RAR, the Δ value specific to MSG3 subcarrier spacing $\mu_{PUSCH}$ is applied in addition to the $K_2$ value.

TABLE 10

Applicable PUSCH time domain resource allocation

| RNTI | PDCCH search space | pusch-Config-Common includes pusch-TimeDomain-AllocationList | pusch-Config includes pusch-TimeDomain-AllocationList | PUSCH time domain resource allocation to apply |
|---|---|---|---|---|
| PUSCH scheduled by MAC RAR | | No Yes | — | Default A pusch-TimeDomain-AllocationList provided in pusch-ConfigCommon |
| C-RNTI, MCS-C-RNTI, TC-RNTI, CS-RNTI | Any common search space associated with CORESET 0 | No Yes | — | Default A pusch-TimeDomain-AllocationList provided in pusch-ConfigCommon |
| C-RNTI, MCS-C-RNTI, TC-RNTI, CS-RNTI | Any common search space not associated with CORESET 0, | No Yes | No No | Default A pusch-TimeDomain-AllocationList provided in pusch-ConfigCommon |

TABLE 10-continued

Applicable PUSCH time domain resource allocation

| RNTI | PDCCH search space | pusch-Config-Common includes pusch-TimeDomain-AllocationList | pusch-Config includes pusch-TimeDomain-AllocationList | PUSCH time domain resource allocation to apply |
|---|---|---|---|---|
| | UE specific search space | No/Yes | Yes | pusch-TimeDomain-AllocationList provided in pusch-Config |

TABLE 11

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 12

Default PUSCH time domain resource allocation A for extended CP

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 13

Definition of value j

| $\mu_{PUSCH}$ | j |
|---|---|
| 0 | 1 |
| 1 | 1 |
| 2 | 2 |
| 3 | 3 |

TABLE 13-continued

Definition of value j

| $\mu_{PUSCH}$ | j |
| --- | --- |

TABLE 14

Definition of value Δ

| $\mu_{PUSCH}$ | Δ |
| --- | --- |
| 0 | 2 |
| 1 | 3 |
| 2 | 4 |
| 3 | 6 |

For the purposes of the present disclosure, it is assumed that the allocated PDSCH/PUSCH symbols are contiguous in time. With respect to the time domain allocation for PDSCH and/or PUSCH, each row of a time domain resource allocation table may be configured by higher layer signaling (e.g., RRC), where at least one table is configured for UL, and at least one table is configured for DL. Each time domain resource allocation table may have up to 16 rows, and each row in a time domain resource allocation table is configured by RRC with a slot offset $K_0$ field using 2 bits (for DL table) or a slot offset $K_2$ field using 3 bits (for UL table), an index (6 bit) into a table/equation capturing valid combinations of start symbol and length (which is jointly encoded), and a PDSCH mapping type field indicating whether type A or type B matching types are applicable. The reference point for starting OFDM symbol should have no RRC impact (e.g., slot boundary, start of CORESET where the PDCCH was found, or part of the table/equation). Additionally, an aggregation factor (1, 2, 4, 8 for DL or UL) is semi-statically configured separately and is not part of the table, which should have little to no additional RRC impact on how to use the aggregation factor along with the tables.

While the aforementioned index uses 6 bits for this indication, 7 bits may be needed to convey the SLIV considering that there are 14 symbols in a slot, and the SLIV jointly encodes the starting symbol and the length of the PDSCH/PUSCH. Embodiments herein indicate the starting symbol and length of PDSCH/PUSCH using no more than 6 bits of RRC signaling. Aspects of such embodiments are based on the observation that not all combinations of starting symbols and lengths for PDSCH/PUSCH may be supported for each of the mapping types (i.e., PDSCH/PUSCH mapping types A and B).

According to various embodiments, the following constraints may be applied for PDSCH/PUSCH mapping type A: the indicated starting symbol may only be one of symbols #0, 1, 2, 3; and the indicated length of the PDSCH/PUSCH is at least L_min, with L_min being no less than 2 symbols and with a maximum of 14 symbols. In an example, L_min=3, or, in another example, L_min=7. According to various embodiments, the following constraints may be applied for PDSCH/PUSCH mapping type B: the indicated length of the PDSCH/PUSCH can be one of 2, 4, or 7 symbols, and/or the indicated length of the PDSCH/PUSCH can be one of 1, 2, 4, or 7 symbols.

As mentioned previously, the rows of the time domain resource allocation table are configured using semi-static RRC signaling, via the signaling of the following components by higher layers: slot offset indication ($K_0$ using 2 bits for DL table or $K_2$ using 3 bits for UL table); a (row) index using 6 bits into a table/equation capturing valid combinations of start symbol and length (jointly encoded); and a PDSCH/PUSCH mapping type of type A or type B.

In an embodiment, the starting symbol and length of the PDSCH/PUSCH for a row of the RRC configured table is determined as a function of the PDSCH/PUSCH mapping type for that row. In an embodiment, the slot offset indication ($K_0$ and $K_2$ values) for a row of the RRC-configured table is determined as a function of the PDSCH/PUSCH mapping type for that row. In an embodiment, when PDSCH/PUSCH mapping type is A, a default table (e.g., one of the tables mentioned above) is used instead of an SLIV based formulation such that all combinations of the following are supported: starting symbol of 0, 1, 2, or 3 and allocation length between 7 through 14 symbols (alternative A1), or starting symbol of 0, 1, 2, or 3 and allocation length between 3 and 14 symbols (alternative A2). For mapping type A, alternative A1 may require 4 states each for lengths 7-10, and 1, 2, 3, and 4 states respectively for lengths 14, 13, 12, 11, resulting in a total of 26 states. For alternative A2, this becomes 26 states+4*4 states=42 states.

In an embodiment, when PDSCH/PUSCH mapping type is B, a default table that is different from the one for PDSCH/PUSCH mapping type A is used instead of an SLIV based formulation such that all combinations of the following are supported: all possible starting locations within a slot are possible for the allocation length of 2, 4, or 7 symbols such that the allocated symbols do not cross the slot-boundary (alternative B1), or all possible starting locations within a slot are possible for the allocation length of 1, 2, 4, or 7 symbols such that the allocated symbols do not cross the slot-boundary (alternative B2). For mapping type B, alternative B1 may require 13, 11, and 8 states respectively for lengths 2, 4, and 7 symbols for a total of 32 states. For alternative B2, this becomes 32 states+14 states=46 states.

In an embodiment for alternatives A1 and B1, a 5-bit or 6-bit table is defined for each of mapping types A and B to indicate the candidate combinations of starting symbols and length of the PDSCH/PUSCH to construct the RRC configured table. In this embodiment, the UE 101 uses the appropriate table based on the 1 bit PDSCH/PUSCH mapping type indicator to determine the starting symbol and length information corresponding to a row to build the RRC table. If a 6 bit table is used, the unused states are reserved.

Further, in an embodiment, for PDSCH mapping type B, the possible valid values of $K_0$ are limited to only one of two values: 0 or 1. Additionally or alternatively, in an embodiment, for PUSCH mapping type B, the possible valid values of $K_2$ are limited to only one of two or four values instead of eight values (corresponding to 3-bit for $K_2$). Additionally or alternatively, in an embodiment, when fallback DCI formats (formats 0_0 and 1_0) are used, the number of bits of the time-domain RA field is reduced from 4 to 2 bits. To help facilitate such reduction, the candidate values for $K_0$, $K_2$ could be reduced to effectively 0 or 1 bit, i.e., either a fixed value or one of two values.

For any of the embodiments discussed herein, it is assumed that the reference point for the starting symbol for the PDSCH/PUSCH is with respect to the slot-boundary. This concept can be straightforwardly applied if the reference point for the starting symbol is with respect to the start of CORESET where the PDCCH was found.

In another embodiment, for PDSCH/PUSCH mapping type B, the reference is the start of CORESET where the PDCCH was found, while for mapping type A, the reference is slot boundary. In such a case, for PDSCH mapping type B, under the assumption that the scheduled PDSCH may only be scheduled within the same slot where the PDCCH was found (i.e., $K_0=0$), the starting symbols of PDSCH may only be such that the resulting symbol index is greater than the symbol index of the CORESET where the PDCCH was found and less than #13. Without the K0=0 constraint, the table specified for mapping type B would indicate negative values when the start of the CORESET is different from symbol #0.

There may be cases wherein lengths other than 2, 4, 7 symbols may need to be supported for mapping type B, for example, for PUSCH mapping type B. In such cases, the table based approach to jointly indicate starting symbol and length may require more than 6 bits. In such cases, instead of using separate bit-fields to indicate the mapping type and the start and length values, these could be jointly encoded as a single field signaled via higher layers to the UE 101. As can be seen from the discussion infra, this can exploit the fact that for each mapping type A or B, the number of valid states for starting symbol and length need not be the same. Therefore, in an embodiment, the PDSCH/PUSCH mapping type and PDSCH/PUSCH starting symbol and length indications are jointly encoded. Such an approach can provide significantly increased flexibility in time domain resource allocation while still limiting the total number of bits for signaling of the PDSCH/PUSCH mapping type and starting symbol and length to 7 bits.

As mentioned previously, separate tables are configured for DL (PDSCH) and UL (PUSCH) from which the DCI bit-field indicates the resource allocation. This means that different tables can be specified for DL and UL, respectively, with no more than 128 rows to jointly encode the PDSCH/PUSCH mapping types and the starting symbols and lengths for the PDSCH/PUSCH. Then the overall time-domain RA field can be built using higher layer signaling of $K_0$ or $K_2$ values and the 7 bit parameter that jointly encodes the set of PDSCH/PUSCH mapping types and the starting symbols and lengths for the PDSCH/PUSCH.

With this framework, the possible combinations for PDSCH and PUSCH regarding the starting symbol (S) and allocation length (L) and the resulting number of states that would need to be supported is shown by table 15 and table 16, respectively. The selection of the ranges for S and L for each mapping type and DL vs. UL channels shown by table 14 follows the existing decisions in 3GPP on characteristics of each mapping type in terms of relative location of the first occurring DMRS symbol, the shared channel type (PDSCH or PUSCH), and corresponding explicit or derived constraints on starting symbol and lengths.

TABLE 15

PDSCH starting symbol and allocation length combinations

| Option | Mapping Type | starting symbol (S) | allocation length (L) | Number of States |
|---|---|---|---|---|
| DL_A1 | mapping type A | {0, 1, 2, 3} | 7 to 14 symbols | 26 |
| DL_A2 | mapping type A | {0, 1, 2, 3} | 4 to 14 symbols | 42 |
| DL_B1 | mapping type B | 0 to 14 depending on the length such that the allocation does not cross the slot boundary | 2, 4, 7 symbols | 32 |
| DL_B2 | mapping type B | 0 to 14 depending on the length such that the allocation does not cross the slot boundary | 1, 2, 4, 7 symbols | 46 |

TABLE 15-continued

PDSCH starting symbol and allocation length combinations

| Option | Mapping Type | starting symbol (S) | allocation length (L) | Number of States |
|---|---|---|---|---|
| DL_B3 | mapping type B | 0 to 14 depending on the length such that the allocation does not cross the slot boundary | 1 to 7 symbols | 77 |
| DL_B4 | mapping type B | 0 to 14 depending on the length such that the allocation does not cross the slot boundary | 1 to 13 symbols | 104 |
| DL_B5 | mapping type B | 0 to 14 depending on the length such that the allocation does not cross the slot boundary | 1 to 14 symbols | 105 |

TABLE 16

PUSCH starting symbol and allocation length combinations

| Option | Mapping Type | starting symbol (S) | allocation length (L) | Number of States |
|---|---|---|---|---|
| UL_A1 | mapping type A | 0 | 7 to 14 symbols | 11 |
| UL_A2 | mapping type A | 0 | 1 to 14 symbols | 14 |
| UL_A3 | mapping type A | {0, 2, 3} | 7 to 14 symbols (S = 0), 7 to 12 symbols (S = 2), 7 to 11 symbols (S = 3) | 14 |
| UL_B1 | mapping type B | S = 0 to 14 depending on the length such that the allocation does not cross the slot boundary | 2, 4, 7 symbols | 32 |
| UL_B2 | mapping type B | 1 to 14 depending on the length such that the allocation does not cross the slot boundary | 1 to 13 symbols | 104 |
| UL_B3 | mapping type B | 0 to 14 depending on the length such that the allocation does not cross the slot boundary | 1 to 14 symbols | 105 |

Based on table 15, it can be seen that following the joint coding approach, in order to remain within the 7 bit (maximum of 128 states) constraint, the following combinations of options can be supported: DL_B1 and either of DL_A1 or DL_A2; DL_B2 and either of DL_A1 or DL_A2; or DL_B3 and either of DL_A1 or DL_A2. To support option DL_B4 or DL_B5 further compression, possibly using joint coding with the $K_0$ value can be used. The feasibility of such an approach can be established based on the fact that $K_0$ can be restricted to either 0 or 1 for PDSCH mapping type B. Note that, although not necessary (as can be seen from analysis below), such joint encoding of all three parameters $K_2$, starting symbol & length, and the PUSCH mapping type can also be used for PUSCH to build the time-domain resource allocation table.

Based on table 16, it can be seen that following the joint coding approach, in order to remain within the 7-bit (maximum of 128 states) constraint, the following combinations of options can be supported: UL_B1 and either of UL_A1, UL_A2, or UL_A3; UL_B2 and either of UL_A1, UL_A2, or UL_A3; and UL_B3 and either of UL_A1, UL_A2, or UL_A3. Note that the DL and UL combinations can be selected independently as they are signaled separately.

In terms of minimum UE 101 processing time (N2) for transmission of PUSCH upon receiving an UL grant in the PDCCH, it has been agreed that if data is mapped to the first symbol of the allocated PUSCH, either entirely or FDM-ed with PUSCH DMRS, an additional symbol is added to the N2 value for the corresponding subcarrier spacing (SCS). However, for PUSCH mapping type A, with PUSCH starting at symbol 0 of a slot, there are two or three data-only symbols preceding the first location of the corresponding PUSCH DMRS (symbol 2 or 3 of a slot). In such a case, the UE would have to prepare equivalent amount of data for mapping to the first two symbols before the PUSCH DMRS can be mapped (the latter can be precomputed). Thus, in one embodiment, an additional k symbols are added to the N2 value in case the PUSCH allocation is such that there are k data-only symbols preceding the first occurrence of the PUSCH DMRS. In another embodiment, k=2 symbols are added to the N2 value for PUSCH with mapping type A with starting symbol 0 of a slot.

In another alternative embodiment can be to use the SLIV-based approach and use 7 bits to indicate the starting symbol and lengths, and separately signal the $K_0$, $K_2$ and PDSCH/PUSCH mapping types. However, in this case, to help the UE 101 implementation, in an embodiment, the UE 101 does not expect to be scheduled with a time domain allocation corresponding to certain combinations of starting symbols and lengths, and PDSCH/PUSCH mapping types. For PDSCH, the excluded combinations can be identified as all combinations (e.g., 105 states for each mapping type) other than the following sets: DL_B1 and either of DL_A1 or DL_A2; DL_B2 and either of DL_A1 or DL_A2; and/or DL_B3 and either of DL_A1 or DL_A2. For PUSCH, the excluded combinations can be identified as all combinations (e.g., 105 states for each mapping type) other than the following sets: UL_B1 and either of UL_A1 or UL_A_2 or UL_A3; UL_B_2 and either of UL_A1 or UL_A2 or UL_A3; and UL_B_3 and either of UL_A1 or UL_A2 or UL_A3.

As mentioned previously, the PDSCH mapping type A corresponds to the case wherein the first PDSCH DMRS occurs in the third or fourth symbol (e.g., symbol #2 or #3) of a slot. In these cases, for very short PDSCH durations with PDSCH starting before the first PDSCH DMRS symbol, it can be challenging for the UE 101 to meet tight processing time requirements due to the combined effect of delay in starting channel estimation for PDSCH demodulation late, and insufficient time in terms of the PDSCH duration for the decoding step to catch up to meet the processing timeline. In an embodiment, for PDSCH mapping type A with PDSCH durations of less than (or less than or equal to) seven symbols, one additional symbol is added to the N1 value for each PDSCH symbol that occurs before the first PDSCH DMRS, for both PDSCH processing capabilities 1 and 2. In another embodiment, such additional time budget to N1 for the case of PDSCH with mapping type A and duration less than (or less than or equal to) seven symbols is added only for PDSCH processing capability 2 and not for PDSCH processing capability 1. In another embodiment, the aforementioned consideration on additional symbols for each PDSCH symbol that occurs before the first PDSCH DMRS for PDSCH mapping type A is applied for PDSCH durations less than or equal to four symbols.

According to various embodiments, the UE 101 may determine a time domain resource allocation indication for mini-slot operation. As mentioned previously, a DCI resource allocation field encodes the starting symbol and duration (allocation length) of PDSCH/PUSCH transmission using a Start and Length Indication Value (SLIV) approach that jointly encodes the starting symbol and duration (allocation length). This approach assumes a contiguous allocation of resources. Additionally, the aggregation factor of {1, 2, 4, 8} is configured semi-statically (e.g., using RRC signaling). The aggregation factor is used to populate the time-domain allocation over multiple slots or within a slot in order to organize bundled and/or repeated transmission of a transport block.

In embodiments where slot-based resource allocation is used, such as for PDSCH/PUSCH mapping type A, if aggregation is configured, the dynamically indicated SLIV based resource allocation or semi-statically derived start and duration (in case of semi-persistent allocation) may be assumed to be repeated in K consecutive valid slots, where K is the aggregation factor configured by RRC.

In embodiments where mini-slot based or non-slot based resource allocation is used, such as for PDSCH/PUSCH mapping type B, if aggregation is configured, the dynamically indicated SLIV based resource allocation or semi-statically derived start and duration (in case of semi-persistent allocation) may be assumed to be repeated in consecutive K groups of valid symbols, where K is the aggregation factor configured by RRC. In these embodiments, the first group of valid symbols is directly derived from the time domain resource allocation field including SLIV indication which signals starting symbol and length in symbols. The other groups of symbols have the same length as the first one and starting symbol index derived as the next valid symbol after the previous group of symbols in an aggregation. In other words, the mini-slots are repeated back-to-back without gaps within the valid symbols. For purposes of the present disclosure, the valid symbols are defined as all symbols of a currently scheduled transmission direction, for example, DL for PDSCH and UL PUSCH. Further, PUSCH transmission case is discussed in more detail infra, however, the aspects related to PUSCH transmission are also applicable to PDSCH multi-slot and multi-mini-slot transmissions.

According to various embodiments, the UE 101 may determine or derive rules for postponing and/or dropping multi-mini-slot transmissions. Multi-mini-slot transmissions may lead to cases where a mini-slot crosses a slot boundary and/or collides with at least scheduled SRS transmission(s). For such cases, dropping and/or postponing rules may need to be defined. In embodiments where a group of symbols in an aggregated multi-mini-slot transmission, such as aggregated PUSCH transmission of mapping type B, is going to cross the slot boundary, such a transmission may need to be postponed. Postponing the transmission may involve shifting in time to the first valid symbol in a next slot relative to the slot where the previous group of symbols was mapped. For example, if a resource allocation (semi-static or dynamic) indicates starting symbol 7 (counting from 0) and a duration (allocation length) of 4 symbols, while the aggregation factor is configured to 4, then the overall repeated resource allocation would be as shown by table 17.

TABLE 17

| | |
|---|---|
| N-th slot: | --------00001111-- |
| N + 1-th slot: | 22223333---------- |

In another example, the groups of symbols that are determined to cross the slot boundary and to be mapped to the next slots(s) are completely dropped as illustrated by table 18, which continues from the example shown by table 17.

TABLE 18

| N-th slot: | --------00001111-- |
|---|---|
| N + 1-th slot: | ------------------ |

In another example, the groups of symbols that are determined to cross the slot boundary are dropped while the groups of symbols that are determined to be mapped to the next slot(s) are kept, as is shown by table 19.

TABLE 19

| N-th slot: | --------00001111-- |
|---|---|
| N + 1-th slot: | --3333------------ |

In another embodiment, if the dynamic or semi-static time-domain resource allocation indicates resources which overlapped with SRS resources, the group(s) of PUSCH symbols fully or partially overlapped with SRS resources are not transmitted. In this case, these PUSCH symbols are either dropped or postponed. The same options as described above for the case of crossing slot boundary are applicable. Alternatively, the PUSCH transmission may be prioritized over the SRS resources and be transmitted instead. The prioritization rule may be based on logical channel priority mapped to the corresponding PUSCH. E.g. the logical channel serving URLLC services may be prioritized over SRS transmissions.

According to various embodiments, the UE 101 may determine or derive priority rules or dropping rules for handling collision (or potential collisions) between SRS and semi-statically or semi-persistently configured UL transmissions. The UE 101 can be configured with one or more SRS resource sets as configured by the higher layer parameter SRS-ResourceSet. For each SRS resource set, the UE 101 may be configured with K≥1 SRS resources via the higher layer parameter SRS-Resource, where the maximum value of K is indicated by the higher layer parameter SRS_capability. The SRS resource set applicability is configured by the higher layer parameter usage in SRS-ResourceSet.

The UE 101 may apply priority rules or dropping rules when an SRS collides with a PUCCH with short duration. For example, the UE 101 may not transmit SRS when semi-persistent and periodic SRS are configured in the same symbol(s) with short PUCCH carrying only CSI reports, or if aperiodic SRS is configured and short PUCCH consists of beam failure request. In the case that SRS is not transmitted due to overlap with short PUCCH, only the SRS symbol(s) that overlap with short PUCCH symbol(s) are dropped. The short PUCCH may not be transmitted when aperiodic SRS happens to overlap in the same symbol with semi-persistent or periodic short PUCCH carrying semi-persistent/periodic CSI report only. Additionally, the UE 101 is not expected to be configured with aperiodic SRS and short PUCCH with aperiodic CSI report in the same symbol. The UE 101 is not expected to be configured with SRS and PUSCH/UL DMRS/UL PTRS/Long PUCCH in the same symbol.

However, there are not any currently defined priority or dropping rules for SRS collisions with semi-statically or semi-persistently configured UL transmissions, including Type 1 and Type 2 grant free UL transmissions, UL semi-persistent transmissions, configured scheduling uplink transmissions, etc.

In one embodiment, the UE 101 does not transmit SRS when semi-persistent and periodic SRS are configured in the same symbol(s) with uplink transmission which is semi-statically or semi-persistently configured. When the SRS is not transmitted due to overlap with uplink transmission, which is semi-statically or semi-persistently configured, only the SRS symbol(s) that overlap with uplink transmission which is semi-statically or semi-persistently configured are dropped.

In another embodiment, the UE 101 does not transmit uplink transmission which is semi-statically or semi-persistently configured when aperiodic SRS happens to overlap in the same symbol with transmit uplink transmission which is semi-statically or semi-persistently configured. In another option, for type 2 UL transmission without grant, when the transmission at the first activated resource collides with aperiodic SRS transmission, the aperiodic SRS transmission is dropped. For the uplink transmission after the first activation, in case when UL transmission without grant collides with aperiodic SRS transmission, UL transmission without grant is dropped.

In another embodiment, when PRACH and physical uplink control channel carrying beam failure request collide with uplink transmission, which is semi-statically or semi-persistently configured, the UE 101 does not transmit uplink transmission which is semi-statically or semi-persistently configured.

In another embodiment, the dropping rule or priority rule may depend on transmission duration or type of uplink transmission. For instance, a mini-slot based uplink transmission which is semi-statically or semi-persistently configured may have higher priority than aperiodic SRS transmission, while a slot based uplink transmission, which is semi-statically or semi-persistently configured may have lower priority than the aperiodic SRS transmission.

Additionally or alternatively, the UE 101 does not transmit the SRS when semi-persistent and periodic SRS are configured in the same symbol(s) with a PUCCH carrying only CSI report(s), or only L1-RSRP report(s). Additionally or alternatively, the UE 101 does not transmit SRS when semi-persistent or periodic SRS is configured or aperiodic SRS is triggered to be transmitted in the same symbol(s) with PUCCH carrying HARQ-ACK and/or SR. In the case that SRS is not transmitted due to overlap with PUCCH, only the SRS symbol(s) that overlap with PUCCH symbol(s) are dropped. In these embodiments, the PUCCH should not be transmitted when aperiodic SRS is triggered to be transmitted to overlap in the same symbol with PUCCH carrying semi-persistent/periodic CSI report(s) or semi-persistent/periodic L1-RSRP report(s) only. In case of intra-band carrier aggregation or in inter-band CA band-band combination where simultaneous SRS/PUCCH/PUSCH and PRACH transmissions are not allowed, the UE 101 is not expected to be configured with SRS and PUSCH/UL DM-RS/UL PT-RS/PUCCH in the same symbol.

According to various embodiments, the UE 101 may include mechanisms for soft buffer handling. These soft buffer handling mechanisms are related to coding, multiplexing, and mapping transport channels and/or TBs to physical channels. In general, data and control streams from/to the MAC layer are encoded/decoded to offer transport and control services over the radio transmission link. The downlink physical-layer processing of transport channels consists of the following steps: transport block CRC attachment: code block segmentation and code block CRC attachment; channel coding (e.g., LDPC coding); physical-layer HARQ processing; rate matching; scrambling; modulation (e.g., QPSK, 16QAM, 64QAM, and/or 256QAM); layer mapping; and mapping to assigned resources and antenna ports. The uplink physical-layer processing of transport channels consists of the following steps: transport Block CRC attachment; code block segmentation and Code Block CRC attachment; channel coding: LDPC coding; physical-layer HARQ processing; rate matching; scrambling; modulation (e.g., π/2 BPSK (with transform precoding only), QPSK, 16QAM, 64QAM and 256QAM); layer mapping, transform precoding (e.g., enabled/disabled by configuration), and pre-coding; and mapping to assigned resources and antenna ports. A channel coding scheme is a combination of error detection, error correcting, rate matching, interleaving and transport channel or control information mapping onto/splitting from physical channels.

The soft buffer handling mechanisms enable the UE 101 to not perform a straight matching in the coding flow in the channel coding of the LDPC code, and then go back all the way to the mother code rate. In general, the LDPC coding scheme involves encoding an input bit sequence denoted by $c_0, c_1, c_2, c_3, \ldots, c_{K-1}$, where K is the number of bits to encode; computing and attaching a CRC, which includes a number of parity bits generated by cyclic generator polynomials; and performing puncturing, which is the process of removing some of the parity bits after encoding with the CRC. This process is performed in reverse for decoding. The code rate for encoding the number of bits can be defined as a ratio of the data rate that is allocated for a subframe and the maximum data rate that ideally can be allocated in that subframe. In other words, the code rate may be defined as the ratio between the TBS and the total number of physical layer bits per subframe that are available for transmission of that TB. A lower code rate means that more redundancy bits are inserted during the channel coding process and a higher code rate means that less redundancy bits are inserted. Sometimes, puncturing has a same or similar effect as encoding with an error correction code with a higher rate, or less redundancy. A punctured code may delete coded or redundant bits in a specific pattern to adjust a code rate up from some lower "mother code" rate.

The number of bits to be encoded and decoded can sometimes be relatively large. When a relatively large number of bits are to be encoded, a relatively large number of bits may be punctured (thrown out) and not transmitted, which may be the same or similar to a high code rate operation. However, the decoder still needs to operate at a lower "mother" code rate when decoding the transmission. This means that the decoder will have to handle a relatively large number of redundancy bits, which increases complexity and taxes decoder throughput. In embodiments, LBRM may be used to alleviate the demands on the decoder, wherein the decoder does not revert to the mother code rate. Instead, the decoder performs decoding at a code rate that is higher than the mother code rate, but may be lower than the code rate used by the encoder. These embodiments enable more efficient decoder implementations at the receivers.

In order to utilize the aforementioned LBRM embodiments, for each link (downlink or uplink), the corresponding parameters (e.g., maximum number of layers supported by the UE 101 for the serving cell and maximum modulation order configured for the serving cell) for that link are used. For example, the downlink parameter settings are used for PDSCH, and uplink parameter settings are used for PUSCH. According to various embodiments, when LBRM is applied, the downlink parameter settings are for downlink TBs and the uplink parameter settings for uplink TBs.

Additionally, the UE 101 can support up to eight layers for downlink, where the maximum number of layers supported by the UE 101 for the serving cell is the maximum number of layers for one transport block. In various embodiments, such that LBRM is the maximum number of layers supported by the UE for the serving cell for a TB such that LBRM is applied based on four layers. This is because a TB cannot map to more than four layers.

For example, the rate matching for LDPC code is defined per coded block and includes bit selection and bit interleaving. The input bit sequence to LDPC rate matching is $d_0, d_1, d_2, \ldots, d_{N-1}$, and the output bit sequence after rate matching is denoted as $f_0, f_1, f_2, \ldots, f_{E-1}$. Bit selection for LDPC rate matching includes writing an LDPC encoded bit sequence $d_0, d_1, d_2, \ldots, d_{N-1}$ into a circular buffer of length $N_{cb}$, for the r-th coded block, where N is a number of encoded bits, $N=66Z_c$ for LDPC base graph 1 and $N=50Z_c$ for LDPC base graph 2, and $Z_c$ is a minimum value in all sets of LDPC lifting size Z. In this example, for the r-th code block, $N_{cb}=N$ if $L_{LBRM}=0$ and $N_{cb}=\min(N, N_{ref})$ otherwise, where $$N_{ref} = \left\lfloor \frac{TBS_{LBRM}}{C \cdot R_{LBRM}} \right\rfloor,$$

$R_{LBRM}=\frac{2}{3}$, $TBS_{LBRM}$ is the LBRM transport block size for UL-SCH or the LBRM transport block size for DL-SCH/PCH, assuming, inter alia, that the maximum number of layers for one TB supported by the UE 101 for the serving cell, which for UL-SCH is according to higher layer parameter ULmaxRank if the parameter is configured; maximum modulation order configured for the serving cell, if configured by higher layers; otherwise a maximum modulation order $Q_m=6$ is assumed for DL-SCH; a maximum coding rate of 948/1024; $n_{PRB}=n_{PRB,LBRM}$, where the value of $n_{PRB,LBRM}$ for DL-SCH is determined according to the initial bandwidth part if there is no other bandwidth part configured to the UE; $N_{RE}=156 \cdot n_{PRB}$; and c is a number of code blocks of the transport block. $n_{PRB,LBRM}$ is 32 when a maximum number of PRBs across all configured BWPs of a carrier is less than 33; 66 when the maximum number of PRBs across all configured BWPs of a carrier is 33 to 66; 107 when the maximum number of PRBs across all configured BWPs of a carrier is 67 to 107; 135 when the maximum number of PRBs across all configured BWPs of a carrier is 108 to 135; 162 when the maximum number of PRBs across all configured BWPs of a carrier is 136 to 162; 217 when the maximum number of PRBs across all configured BWPs of a carrier is 163 to 217; or 273 when the maximum number of PRBs across all configured BWPs of a carrier is larger than 217.

In these embodiments, the soft buffer may be dimensioned so as to not require simultaneous support of peak rate, full IR support, and the maximum number of HARQ processes. In one example, Mlimit*($TBS_{LBRM}/R_{LBRM}$) may be used as the number of soft buffer bits stored for a given CC. If the maximum number of HARQ processes supported for NR is 8 or 16, then $M_{limit}$ can be a smaller value than 8 or 16 (e.g., 4, may depend on N1 value) to reflect the UE storage is not dimensioned for the simultaneous support of peak rate/full IR and max HARQ processes.

Some concerns have been raised on applying very small value such as 2 ms always. On the other hand, from the perspective of the UE 101, it may be desirable to not offer excessive soft buffer by using larger RTTs, such as when the UE 101 supports relatively aggressive processing times, which may allow faster RTTs. In one embodiment, different reference RTTs are used for carriers in different frequency regions, where relatively aggressive reference RTT numbers are used for scenarios where higher data rates and faster RTTs are desired. In one example of such embodiments includes: reference HARQ_RTT is [X] ms for frequencies below 3 GHz and FR1, and a reference HARQ_RTT of [2] ms for 3-6 GHz and FR1.

The peak data rate formula can be adapted to include reference HARQ_RTT per component carrier to obtain the soft buffer dimensioning. An example of such a formula is shown by the following equation.

$$SoftBuffer = \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right) \cdot refHARQRTT^{(j)}$$

Referring back to FIG. 1, the RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

The CN 120 includes one or more servers 122, which may implement various core network elements or application functions (AFs) such as those discussed herein. The CN 120 is shown to be communicatively coupled to application servers 130 via an IP communications interface 125. The application server(s) 130 comprise one or more physical and/or virtualized systems for providing functionality (or services) to one or more clients (e.g., UEs 101) over a network (e.g., network 150). The server(s) 130 may include various computer devices with rack computing architecture component(s), tower computing architecture component(s), blade computing architecture component(s), and/or the like. The server(s) 130 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 130 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 130 offer applications or services that use IP/network resources. As examples, the server(s) 130 may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) 130 can also be configured to support one or more communication services (e.g., Voice-over-Internet Protocol (VoIP) sessions, PTT sessions, group communication sessions, social networking services, etc.) for the UEs 101 via the CN 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs. An example architecture wherein the CN 120 is an EPC 120 is shown by FIG. 2.

Figure 2:
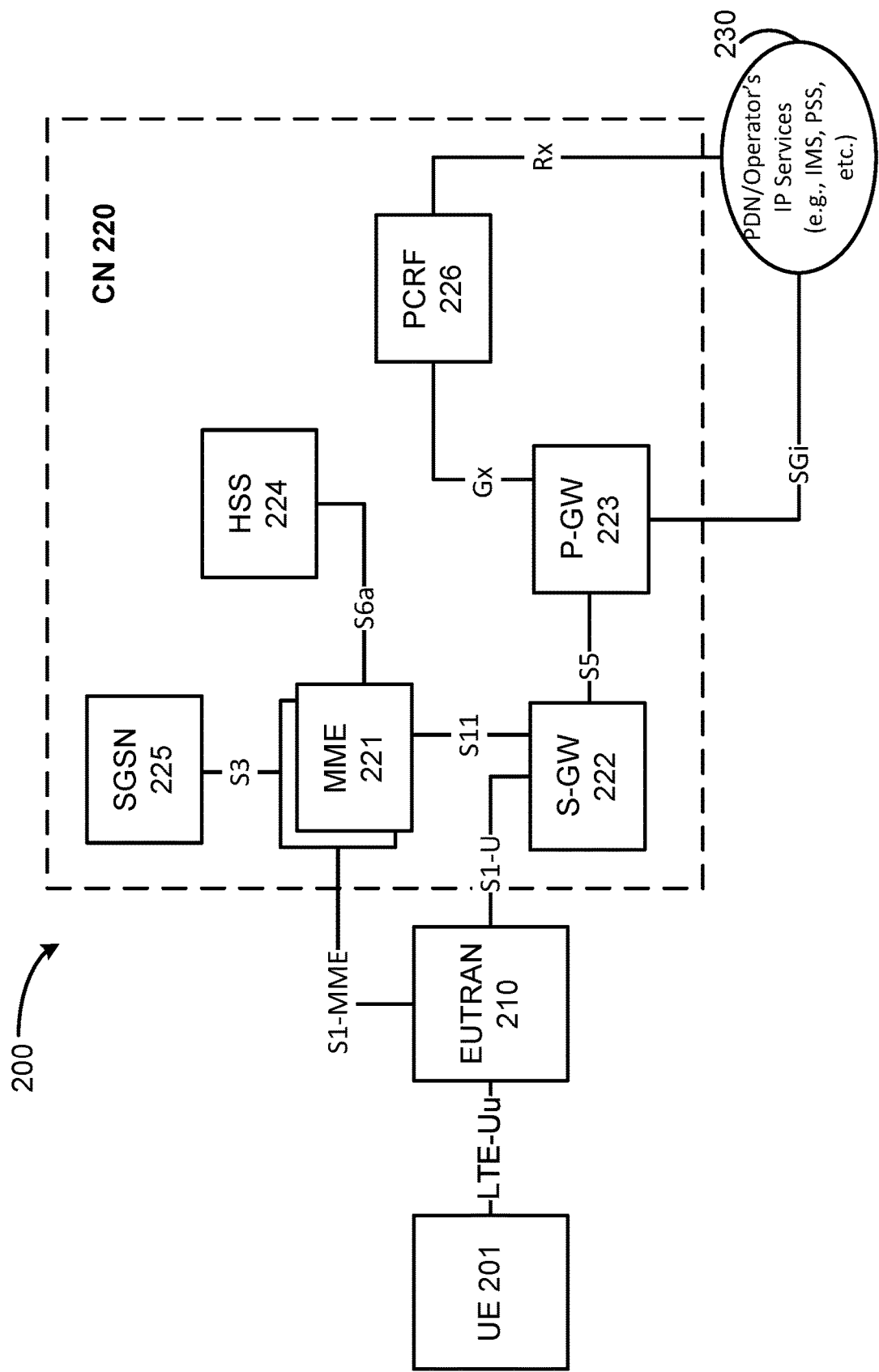
FIG. 2 depicts an architecture of a system including a first core network in accordance with some embodiments.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UF 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) refers to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
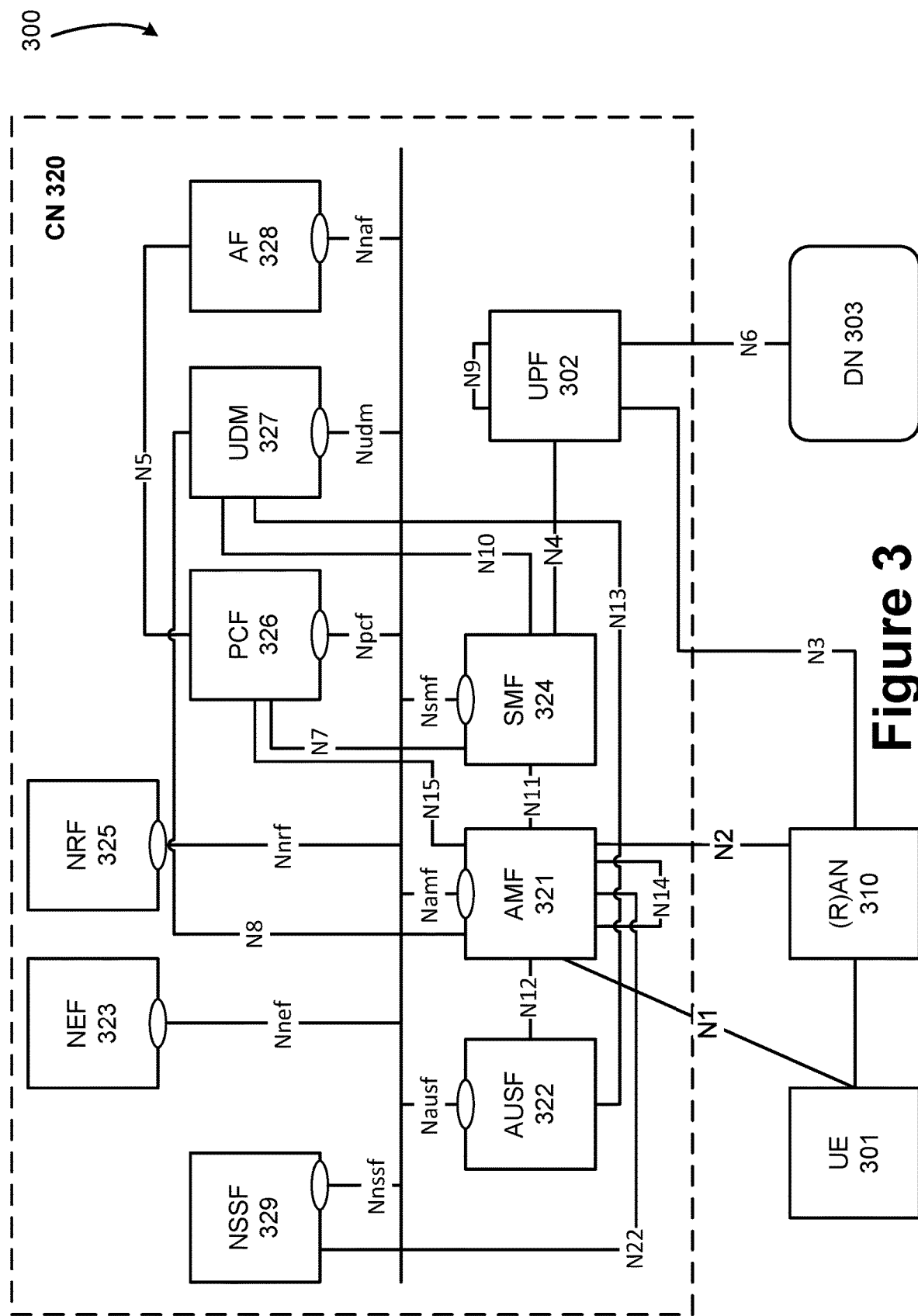
FIG. 3 depicts an architecture of a system including a second core network in accordance with some embodiments.

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The κGC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the an N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 may be a termination point of a RAN CP interface, which may include or be an N2 reference point between the (R)AN 310 and the AMF 321; and the AMF 321 may be a termination point of NAS (N1) signalling, and perform NAS ciphering and integrity protection.

AMF 321 may also support NAS signalling with a UE 301 over an N3 IWF interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signalling from the SMF 324 and the AMF 321 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services. RM is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various embodiments, the AMF 321 may store a CE mode B Restriction parameter of the UE 301 in an associated MM context or RM context. The AMF 321 may also derive the value, when needed, from the UE's usage setting parameter already stored in the UE context (and/or MM/RM context).

CM may be used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for non-3GPP access) and the N2 connection for the UE 301 between the AN (e.g., RAN 310) and the AIF 321. The UE 301 may operate in one of two CM states, CM-IDLE mode or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions: controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM refers to management of a PDU session, and a PDU session or "session" refers to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like refers to the creation of an instance, and an "instance" refers to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed NSSAI and the mapping to the subscribed S-NSSAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
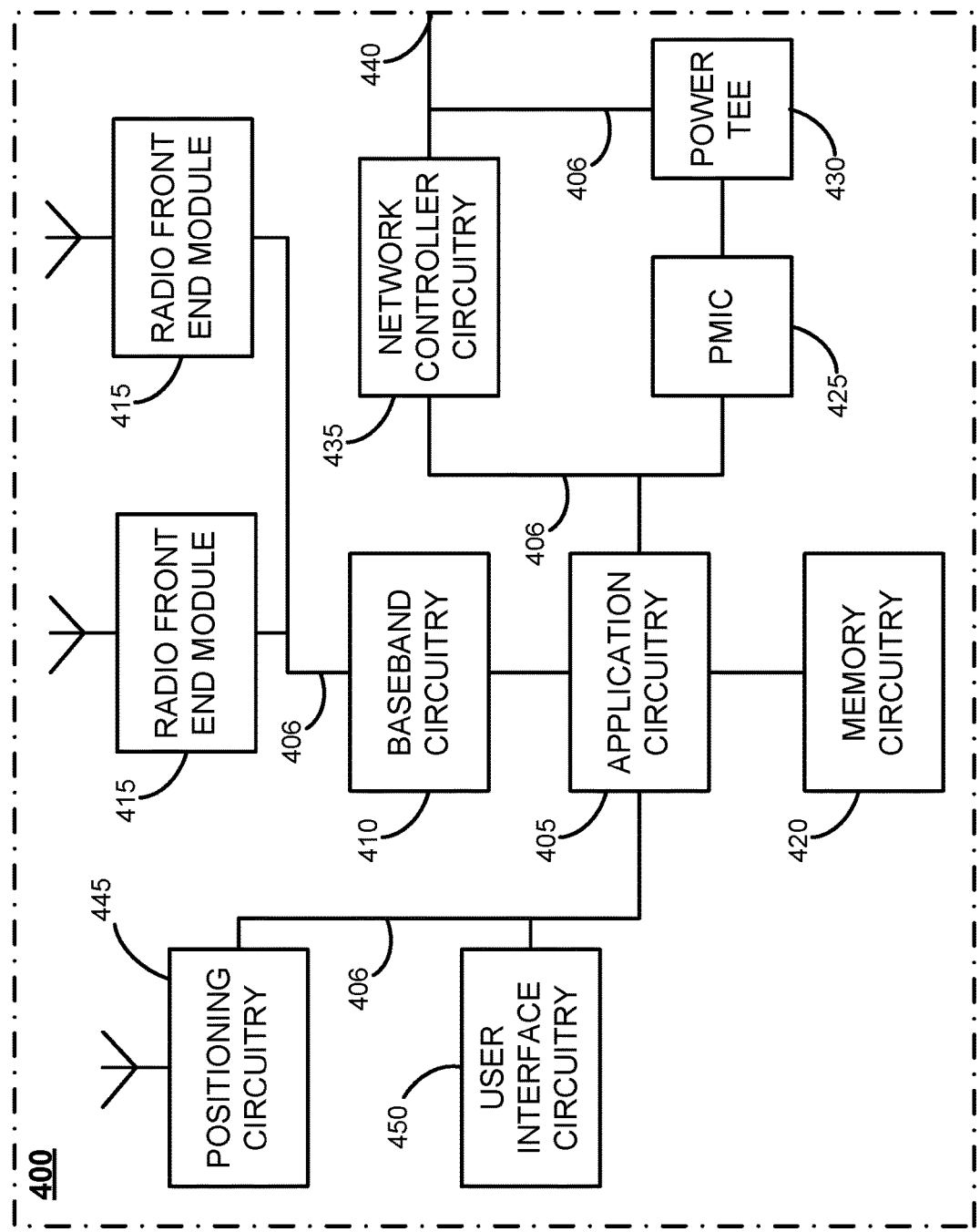
FIG. 4 depicts an example of infrastructure equipment in accordance with various embodiments.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 7.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 communicate with one another using interface circuitry, which may include interconnect (IX) 406. The IX 406 may include any number of bus and/or IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 5:
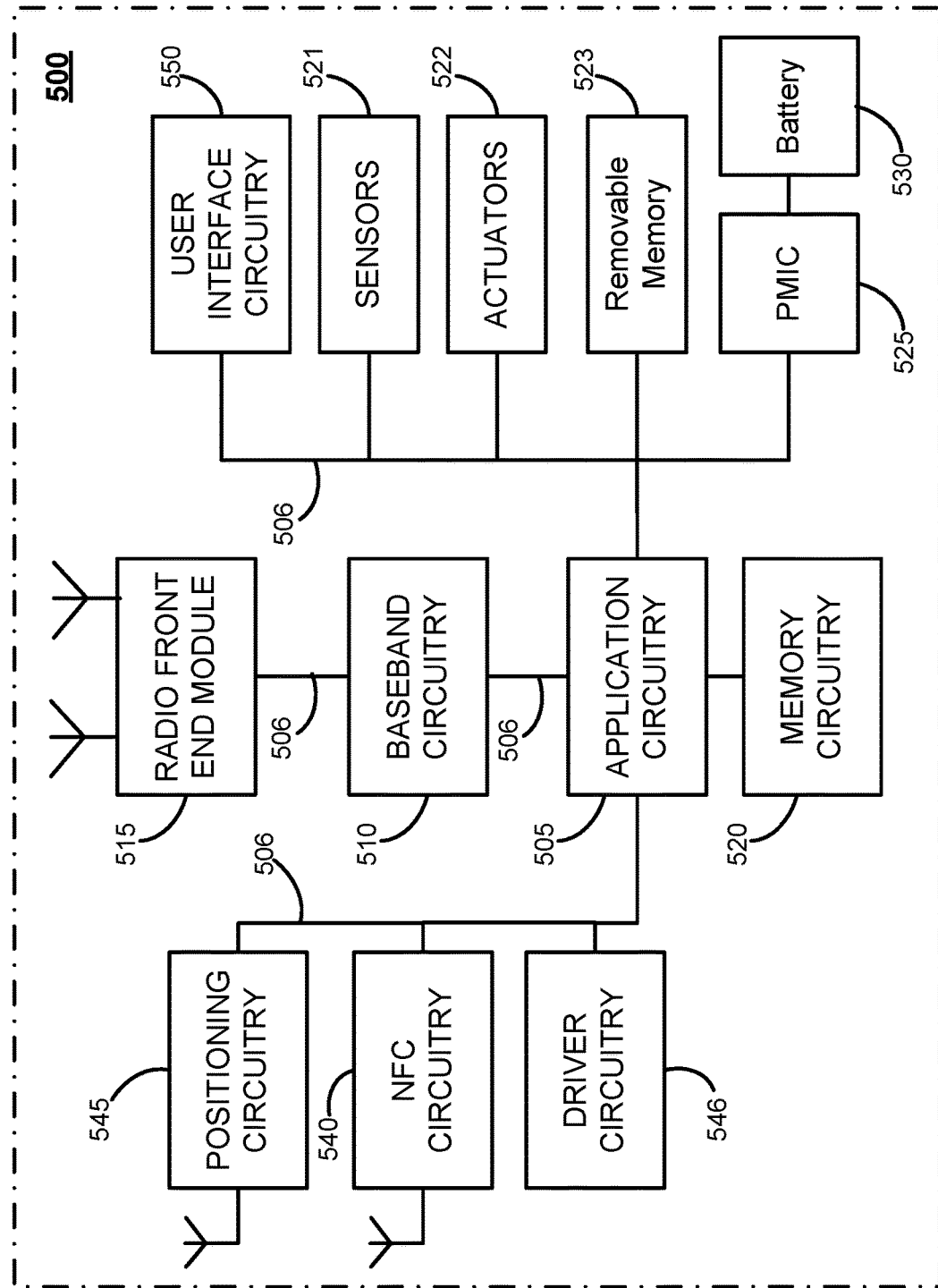
FIG. 5 depicts example components of a computer platform in accordance with various embodiments.

FIG. 5 illustrates an example of a platform 500 (or "device 500") in accordance with various embodiments. In embodiments, the computer platform 500 may be suitable for use as UEs 101, 202, 301, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. The processors (or cores) of the application circuitry 405 may be coupled with or may include memory/storage and may be configured to execute instructions stored in the memory/storage to enable various applications or operating systems to run on the system 500. In these embodiments, the processors (or cores) of the application circuitry 405 are configured to operate application software to provide a specific service to a user of the system 500. In some embodiments, the application circuitry 405 may comprise, or may be, a special-purpose processor/controller to operate according to the various embodiments herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation. Other examples of the processor circuitry of application circuitry 405 are mentioned elsewhere in the present disclosure.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The baseband circuitry 510 may include circuitry such as, but not limited to, one or more single-core or multi-core processors (e.g., one or more baseband processors) or control logic to process baseband signals received from a receive signal path of the RFEMs 515, and to generate baseband signals to be provided to the RFEMs 515 via a transmit signal path. In various embodiments, the baseband circuitry 510 may implement a real-time OS (RTOS) to manage resources of the baseband circuitry 510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. The various hardware electronic elements of baseband circuitry 510 are discussed infra with regard to FIG. 7.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

In some implementations, the memory circuitry 520 and/or the removable memory 523 provide persistent storage of information such as data, applications, operating systems (OS), and so forth. The persistent storage circuitry is configured to store computational logic (or "modules") in the form of software, firmware, or hardware commands to implement the techniques described herein. The computational logic may be employed to store working copies and/or permanent copies of computer programs (or data to create the computer programs) for the operation of various components of platform 500 (e.g., drivers, etc.), an operating system of platform 500, one or more applications, and/or for carrying out the embodiments discussed herein. The computational logic may be stored or loaded into memory circuitry 520 as instructions (or data to create the instructions) for execution by the application circuitry 505 to provide the functions described herein. The various elements may be implemented by assembler instructions supported by processor circuitry or high-level languages that may be compiled into such instructions (or data to create the instructions). The permanent copy of the programming instructions may be placed into persistent storage devices of persistent storage circuitry in the factory or in the field through, for example, a distribution medium (not shown), through a communication interface (e.g., from a distribution server (not shown)), or OTA.

Figure 9:
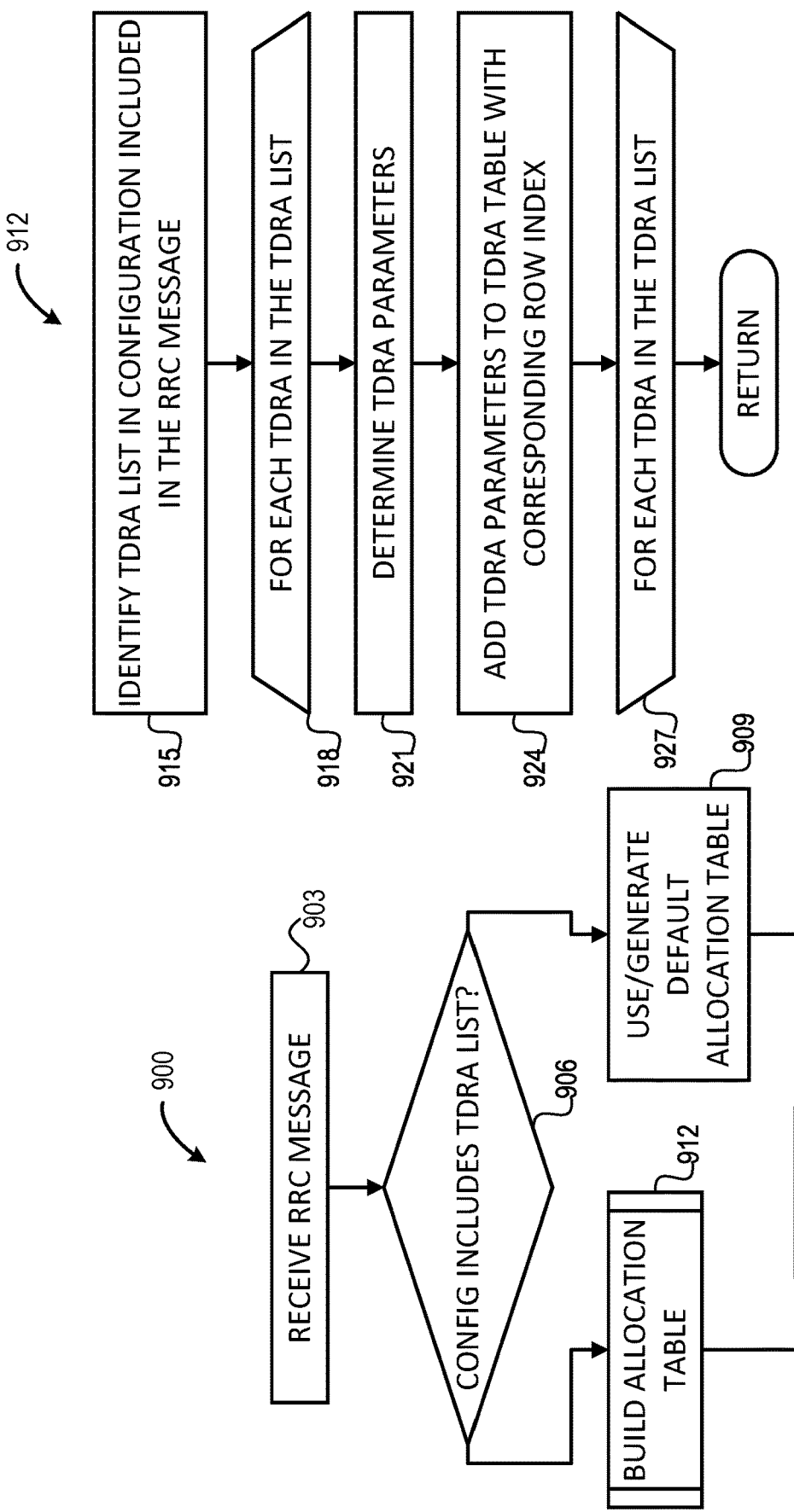
FIGS. 9-11 depict example processes for practicing the various embodiments discussed herein. In particular.
Figure 10:
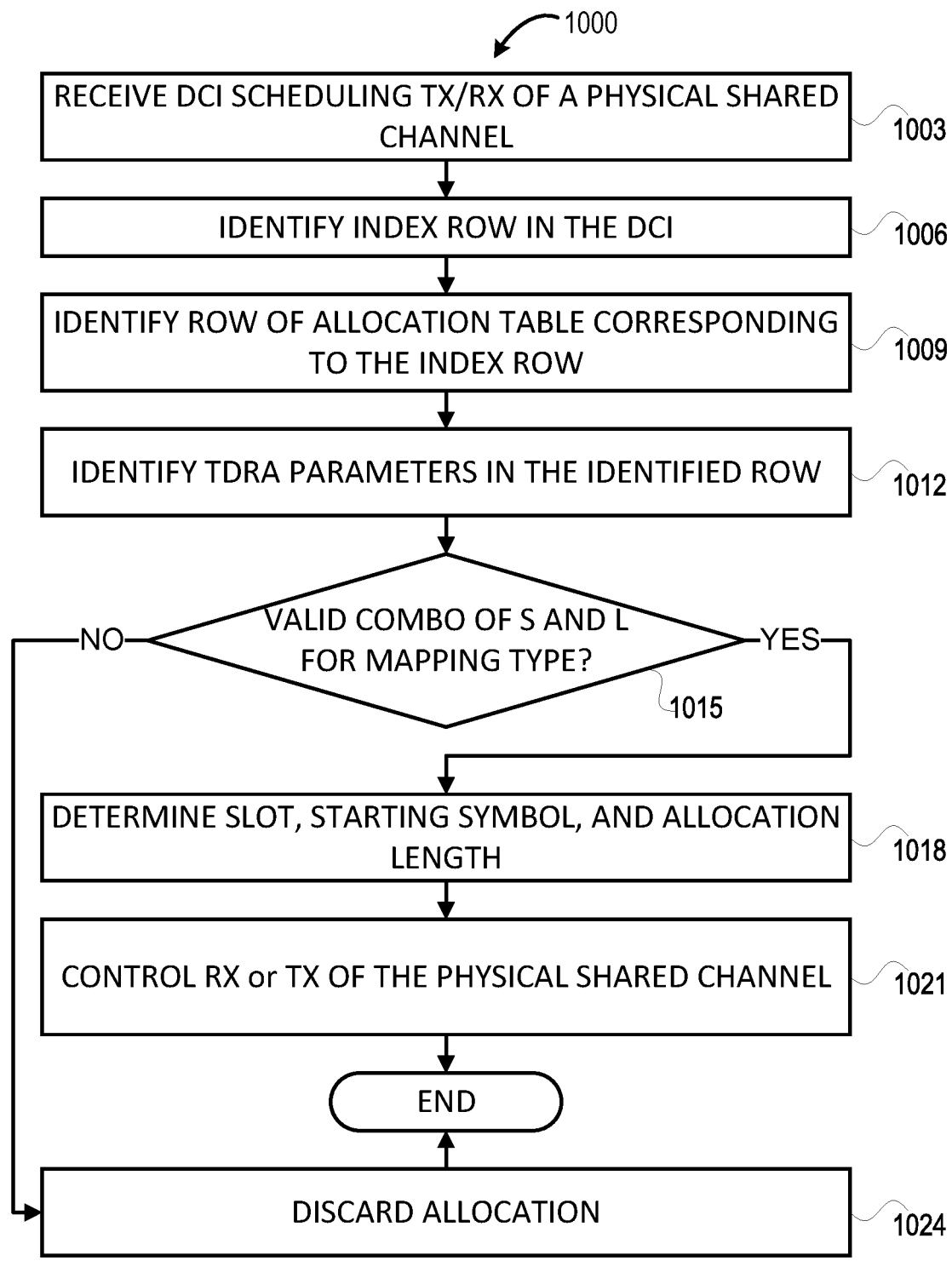
Figure 11:
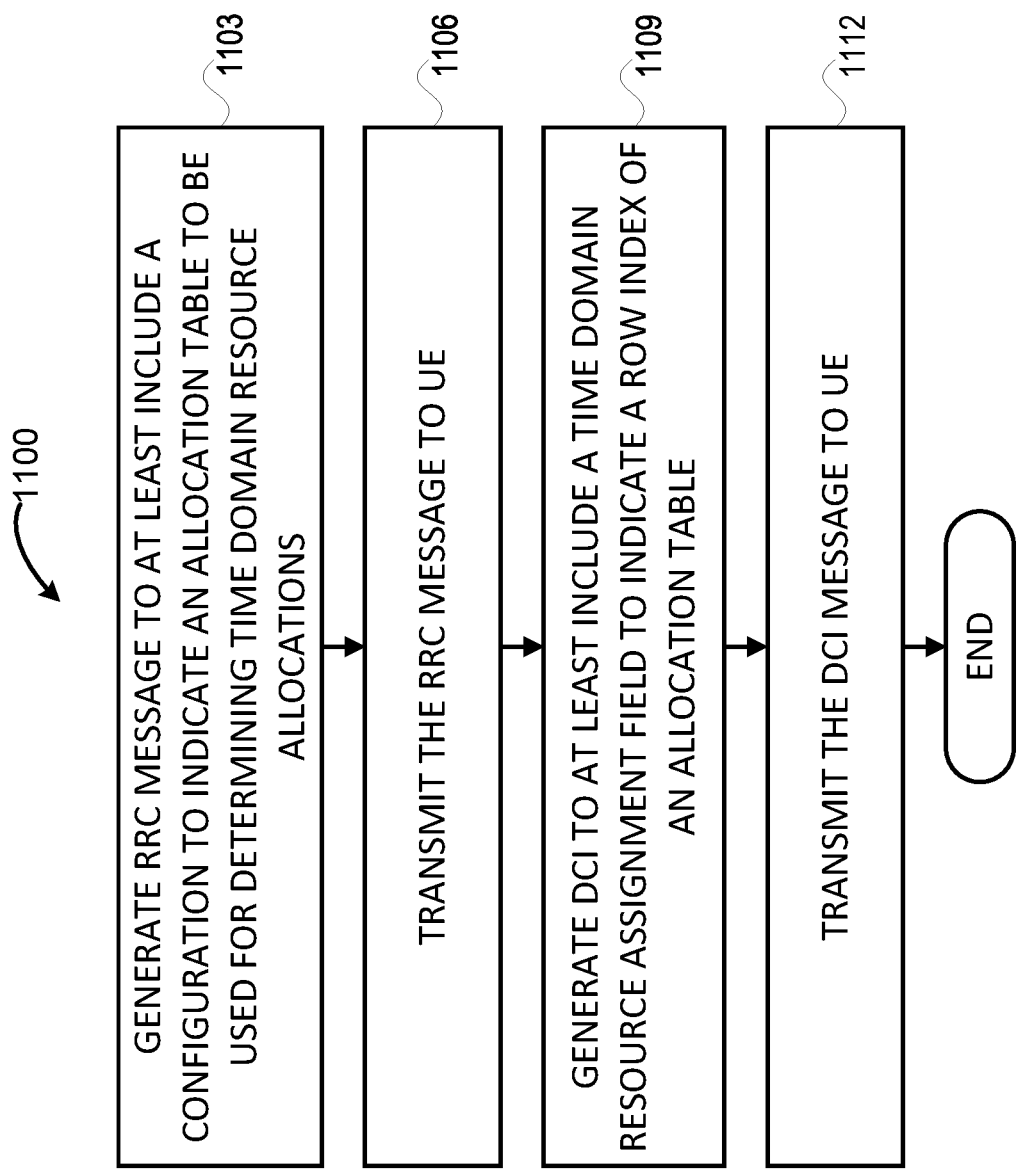

In an example, the instructions provided via the memory circuitry 520 and/or the persistent storage circuitry are embodied as one or more non-transitory computer readable storage media including program code, a computer program product (or data to create the computer program) with the computer program or data, to direct the application circuitry 505 of platform 500 to perform electronic operations in the platform 500, and/or to perform a specific sequence or flow of actions, for example, as described with respect to the flowchart(s) and block diagram(s) of operations and functionality depicted infra (see e.g., FIGS. 9-11). The application circuitry 505 accesses the one or more non-transitory computer readable storage media over the IX 506.

Although the instructions and/or computational logic have been described as code blocks included in the memory circuitry 520 and/or code blocks in the persistent storage circuitry, it should be understood that any of the code blocks may be replaced with hardwired circuits, for example, built into an FPGA, ASIC, or some other suitable circuitry. For example, where application circuitry 505 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The platform 500 may also include interface circuitry (not shown) that is used to connect external devices with the platform 500. The external devices connected to the platform 500 via the interface circuitry include sensor circuitry 521 and actuators 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors;

temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

Actuators 522 include devices, modules, or subsystems whose purpose is to enable platform 500 to change its state, position, and/or orientation, or move or control a mechanism or (sub)system. The actuators 522 comprise electrical and/or mechanical devices for moving or controlling a mechanism or system, and converts energy (e.g., electric current or moving air and/or liquid) into some kind of motion. The actuators 522 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 522 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 522 based on one or more captured events and/or instructions or control signals received from a service provider and/or various client systems.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 510 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, actuator drivers to obtain actuator positions of the actuators 522 and/or control and allow access to the actuators 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 201, 301.

In some embodiments, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as DRX after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more actuators 522 may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 5 communicate with one another using interface circuitry, which may include interconnect (IX) 506. The IX 506 may include any number of bus and/or IX technologies such as ISA, EISA, I²C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a HyperTransport interconnect, Time-Trigger Protocol (TTP) system, a FlexRay system, and/or any number of other IX technologies. The IX technology may be a proprietary bus, for example, used in an SoC based system.

Figure 6:
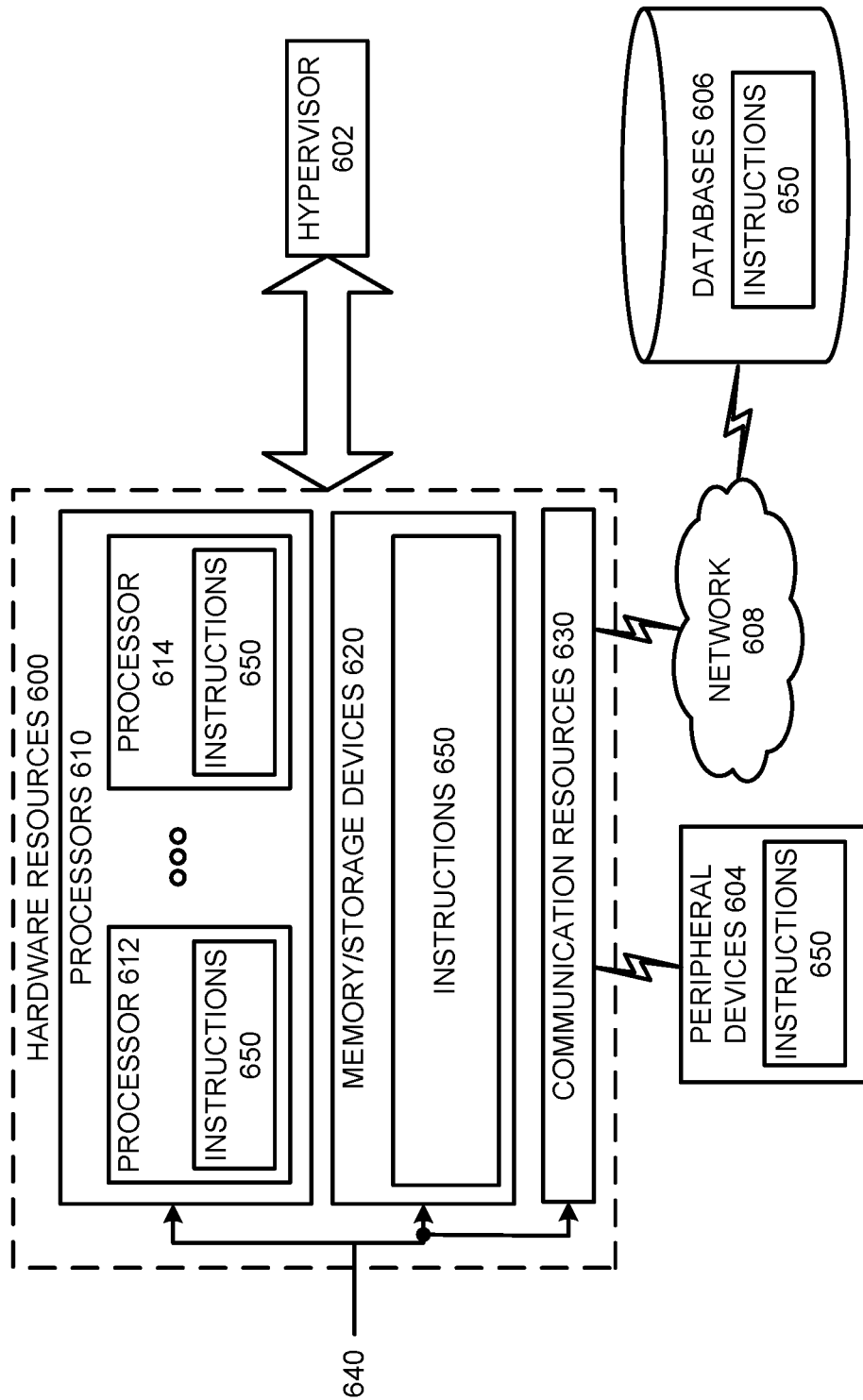
FIG. 6 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 6 illustrates components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processor(s) 610 may be, for example, a CPU, a reduced instruction set computing (RISC) processor, a CISC processor, a GPU, a DSP such as a baseband processor, an ASIC, an FPGA, a RFIC, another processor (including those discussed herein), or any suitable combination thereof. The memory/storage devices 620 may include main memory, disk storage, or any suitable combination thereof. The memory/storage devices 620 may include, but are not limited to, any type of volatile or nonvolatile memory such as DRAM, SRAM, EPROM, EEPROM, Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via USB), cellular communication components, NFC components, Bluetooth® (or Bluetooth® Low Energy) components, Wi-Fi® components, and other communication components, such as those discussed herein.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
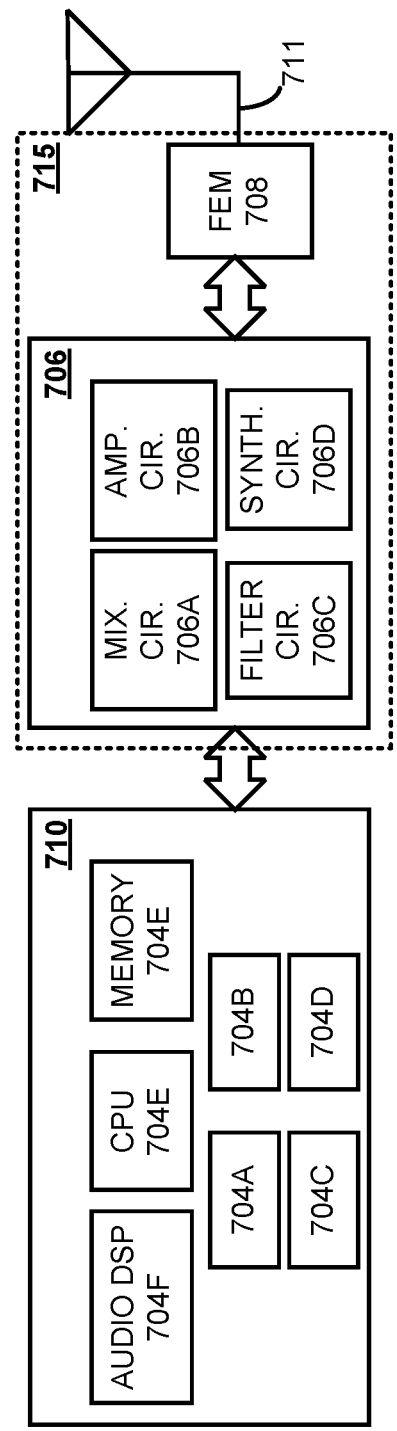
FIG. 7 depicts example components of baseband circuitry and radio frequency circuitry in accordance with various embodiments.

FIG. 7 illustrates example components of baseband circuitry 710 and radio front end modules (RFEM) 715 in accordance with various embodiments. The baseband circuitry 710 corresponds to the baseband circuitry 410 and 510 of FIGS. 4 and 5, respectively. The RFEM 715 corresponds to the RFEM 415 and 515 of FIGS. 4 and 5, respectively. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, LDPC, and/or polar code encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 405/505 (see FIGS. 4 and 5) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., 6G, etc.). In other embodiments, some or all of the functionality of baseband processors 704A-D may be included in modules stored in the memory 704G and executed via a CPU 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio DSPs 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 405/505 of FIGS. 4-7), an RF circuitry interface to send/receive data to/from RF circuitry 706 of FIG. 7; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 405/505 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 405/505 depending on the desired output frequency. In some embodiments, a divider control input (e.g., N) may be determined from a look-up table based on a channel indicated by the application circuitry 405/505.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 405/505 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail infra.

Figure 8:
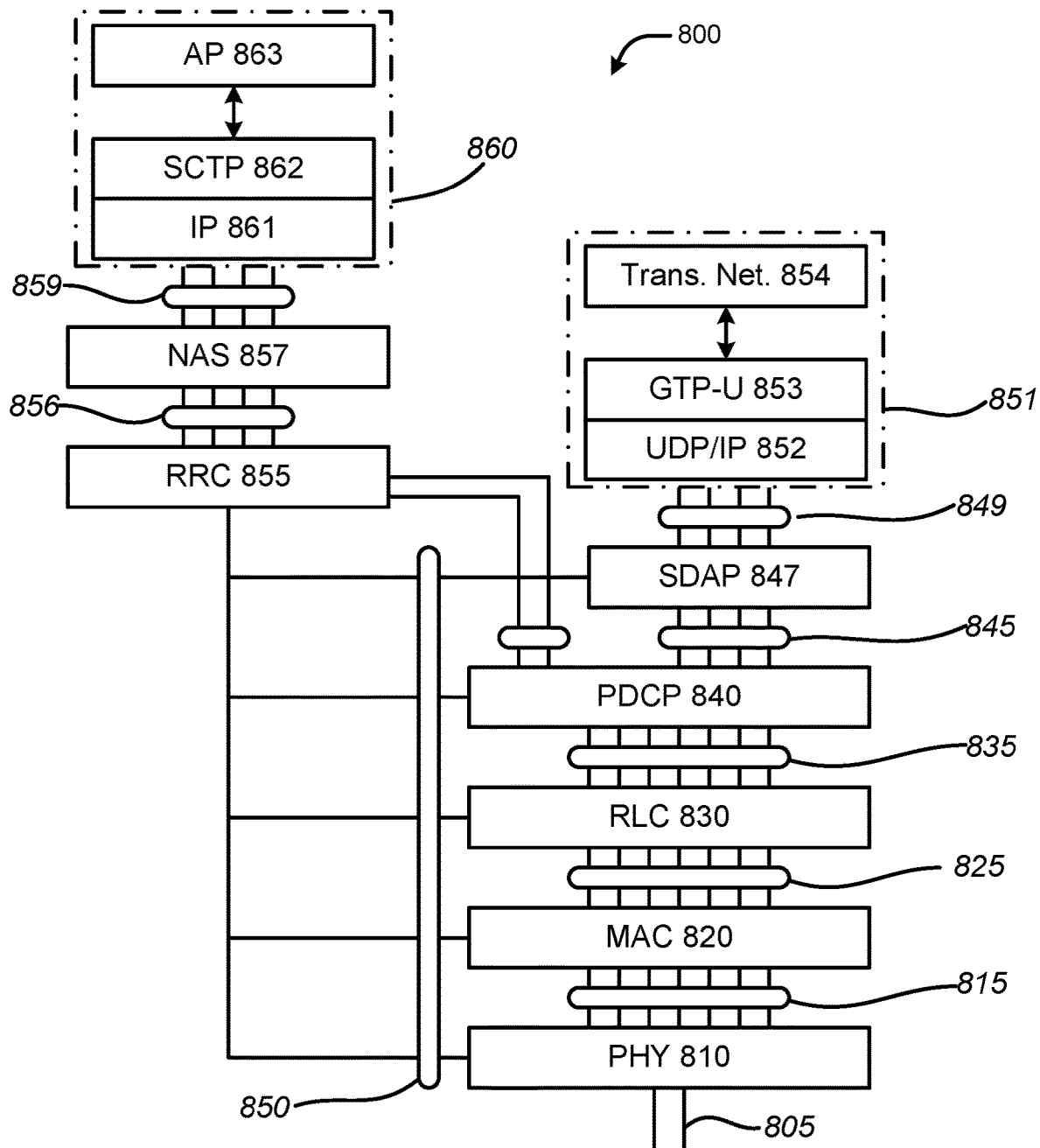
FIG. 8 is an illustration of various protocol functions that may be used for various protocol stacks in accordance with various embodiments.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may comprise one or more transport channels.

Instance(s) of MAC 820 may process requests from, and provide indications to, an instance of RLC 830 via one or more MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

According to various embodiments, RRC 855 is used to configure UE specific PDSCH parameters and/or PUSCH parameters. For example, the RRC 855 of a RAN node 111 may transmit a suitable RRC message (e.g., an RRC connection establishment message, RRC connection reconfiguration message, or the like) to the UE 101, where the RRC message includes one or more IEs, which is a structural element containing one or more fields where each field includes parameters, content, and/or data. The parameters, content, and/or data included in the one or more fields of the IEs are used to configure the UE 101 to operate in a particular manner. In some embodiments, a PDSCH configuration (PDSCH-Config) IE is used to configure UE specific PDSCH parameters, and a PUSCH configuration (PUSCH-Config) IE is used to configure UE specific PUSCH parameters applicable to a particular BWP. An example PDSCH-Config IE is shown by table 20 and table 21 shows field descriptions for the fields of the PDSCH-Config IE. An example PUSCH-Config IE is shown by table 22 and table 23 shows the field descriptions for the fields of the PDSCH-Config IE.

TABLE 20

PDSCH-Config information element

```
-- ASN1START
-- TAG-PDSCH-CONFIG-START
PDSCH-Config ::=                                SEQUENCE {
        dataScramblingIdentityPDSCH                     INTEGER (0..1023)
OPTIONAL,   -- Need S
        dmrs-DownlinkForPDSCH-MappingTypeA              SetupRelease { DMRS-
DownlinkConfig }                                                OPTIONAL,   -- Need M
        dmrs-DownlinkForPDSCH-MappingTypeB              SetupRelease { DMRS-
DownlinkConfig }                                                OPTIONAL,   -- Need M
        tci-StatesToAddModList                          SEQUENCE (SIZE(1..maxNrofTCI-
States)) OF TCI-State                           OPTIONAL,   -- Need N
        tci-StatesToReleaseList                         SEQUENCE (SIZE(1..maxNrofTCI-
States)) OF TCI-StateId                         OPTIONAL,   -- Need N
        vrb-ToPRB-Interleaver                           ENUMERATED {n2, n4}
```

TABLE 20-continued

| PDSCH-Config information element |
|---|

```
OPTIONAL,    -- Need S
        resourceAllocation                      ENUMERATED {
resourceAllocationType0, resourceAllocationType1, dynamicSwitch},
        pdsch-TimeDomainAllocationList          SetupRelease { PDSCH-
TimeDomainResourceAllocationList }                   OPTIONAL,    -- Need M
        pdsch-AggregationFactor                 ENUMERATED { n2, n4, n8 }
OPTIONAL,    -- Need S
        rateMatchPatternToAddModList            SEQUENCE (SIZE
(1..maxNrofRateMatchPatterns)) OF RateMatchPattern      OPTIONAL,    -- Need
N
        rateMatchPatternToReleaseList           SEQUENCE (SIZE
(1..maxNrofRateMatchPatterns)) OF RateMatchPatternId    OPTIONAL,    -- Need
N
        rateMatchPatternGroup1                  RateMatchPatternGroup
OPTIONAL,    -- Need R
        rateMatchPatternGroup2                  RateMatchPatternGroup
OPTIONAL,    -- Need R
        rbg-Size                                ENUMERATED {config1, config2},
        mcs-Table                               ENUMERATED {qam256, qam64LowSE}
OPTIONAL,    --- Need S
        maxNrofCodeWordsScheduledByDCI          ENUMERATED {n1, n2}
OPTIONAL,    -- Need R
        prb-BundlingType                        CHOICE {
            staticBundling                          SEQUENCE {
                bundleSize                              ENUMERATED { n4,
wideband }                                  OPTIONAL       -- Need S
            },
            dynamicBundling                         SEQUENCE {
                bundleSizeSet1                          ENUMERATED { n4,
wideband, n2-wideband, n4-wideband }        OPTIONAL,   -- Need S
                bundleSizeSet2                          ENUMERATED { n4,
wideband }                                  OPTIONAL       -- Need S
            }
        },
        zp-CSI-RS-ResourceToAddModList          SEQUENCE (SIZE
(1..maxNrofZP-CSI-RS-Resources)) OF ZP-CSI-RS-Resource          OPTIONAL, --
Need N
        zp-CSI-RS-ResourceToReleaseList         SEQUENCE (SIZE
(1..maxNrofZP-CSI-RS-Resources)) OF ZP-CSI-RS-ResourceId        OPTIONAL, --
Need N
        aperiodic-ZP-CSI-RS-ResourceSetsToAddModList    SEQUENCE (SIZE
(1..maxNrofZP-CSI-RS-ResourceSets)) OF ZP-CSI-RS-ResourceSet    OPTIONAL, --
Need N
        aperiodic-ZP-CSI-RS-ResourceSetsToReleaseList   SEQUENCE (SIZE
(1..maxNrofZP-CSI-RS-ResourceSets)) OF ZP-CSI-RS-ResourceSetId  OPTIONAL,
-- NeedN
        sp-ZP-CSI-RS-ResourceSetsToAddModList   SEQUENCE (SIZE (1..maxNrofZP-
CSI-RS-ResourceSets)) OF ZP-CSI-RS-ResourceSet          OPTIONAL,   -- Need N
        sp-ZP-CSI-RS-ResourceSetsToReleaseList  SEQUENCE (SIZE (1..maxNrofZP-
CSI-RS-ResourceSets)) OF ZP-CSI-RS-ResourceSetId        OPTIONAL,   -- Need N
        p-ZP-CSI-RS-ResourceSet                 SetupRelease { ZP-CSI-RS-
ResourceSet }                                           OPTIONAL,   --
Need M
        ...
}
RateMatchPatternGroup ::=                       SEQUENCE (SIZE
(1..maxNrofRateMatchPatternsPerGroup)) OF CHOICE {
        cellLevel                               RateMatchPatternId,
        bwpLevel                                RateMatchPatternId
}
-- TAG-PDSCH-CONFIG-STOP
-- ASN1STOP
```

TABLE 21

PDSCH-Config field descriptions aperiodic-ZP-CSI-RS-ResourceSetsToAddModList

AddMod/Release lists for configuring aperiodically triggered zero-power CSI-RS resource sets. Each set contains a ZP-CSI-RS-ResourceSetId and the IDs of one or more ZP-CSI-RS-Resources (the actual resources are defined in the zp-CSI-RS-ResourceToAddModList). The network configures the UE with at most 3 aperiodic ZP-CSI-RS-ResourceSets and it uses only the ZP-CSI-RS-ResourceSetId 1 to 3. The network triggers a set by indicating its ZP-CSI-RS-ResourceSetId in the DCI payload. The DCI codepoint '01' triggers the resource set with ZP-CSI-RS-ResourceSetId 1, the DCI codepoint '10' triggers the resource set with ZP-CSI-RS-ResourceSetId 2, and the DCI codepoint '11' triggers the resource set with ZP-CSI-RS-ResourceSetId 3. Corresponds to L1 parameter 'Aperiodic-ZP-CSI-RS-Resource-List'.

dataScramblingIdentityPDSCH

Identifier used to initialize data scrambling (c_init) for PDSCH. If the field is absent, the UE applies the physical cell ID.

dmrs-DownlinkForPDSCH-MappingTypeA

DMRS configuration for PDSCH transmissions using PDSCH mapping type A (chosen dynamically via PDSCH-TimeDomainResourceAllocation). Only the fields dmrs-Type, dmrs-AdditionalPosition and maxLength may be set differently for mapping type A and B.

dmrs-DownlinkForPDSCH-MappingTypeB
DMRS configuration for PDSCH transmissions using PDSCH mapping type B (chosen dynamically via PDSCH-TimeDomainResourceAllocation). Only the fields dmrs-Type, dmrs-AdditionalPosition and maxLength may be set differently for mapping type A and B.

maxNrofCodeWordsScheduledByDCI
Maximum number of code words that a single DCI may schedule. This changes the number of MCS/RV/NDI bits in the DCI message from 1 to 2.

mcs-Table

Indicates which MCS table the UE shall use for PDSCH. If the field is absent the UE applies the value 64 QAM.

pdsch-AggregationFactor

Number of repetitions for data. Corresponds to L1 parameter 'aggregation-factor-DL'. When the field is absent the UE applies the value 1 pdsch-TimeDomainAllocationList

List of time-domain configurations for timing of DL assignment to DL data. If configured, the values provided herein override the values received in corresponding PDSCH-ConfigCommon for PDCCH scrambled with C-RNTI or CS-RNTI but not for CORESET#0 for which the default values in table 3 apply.

prb-BundlingType

Indicates the PRB bundle type and bundle size(s). Corresponds to L1 parameter 'PRB_bundling'. If dynamic is chosen, the actual bundleSizeSet1 or bundleSizeSet2 to use is indicated via DCI. Constraints on bundleSize(Set) setting depending on wb-ToPRB-Interleaver and rbg-Size settings. If a bundleSize(Set) value is absent, the UE applies the value n2.

p-ZP-CSI-RS-ResourceSet

A set of periodically occurring ZP-CSI-RS-Resources (the actual resources are defined in the zp-CSI-RS-ResourceToAddModList). The network uses the ZP-CSI-RS-ResourceSetId = 0 for this set.

rateMatchPatternGroup1

The IDs of a first group of RateMatchPatterns defined in PDSCH-Config->rateMatchPatternToAddModList (BWP level) or in ServingCellConfig ->rateMatchPatternToAddModList (cell level). These patterns can be activated dynamically by DCI. Corresponds to L1 parameter 'Resource-set-group-1'.

rateMatchPatternGroup2

The IDs of a second group of RateMatchPatterns defined in PDSCH-Config->rateMatchPatternToAddModList (BWP level) or in ServingCellConfig ->rateMatchPatternToAddModList (cell level). These patterns can be activated dynamically by DCI. Corresponds to L1 parameter 'Resource-set-group-2'.

rateMatchPatternToAddModList
Resources patterns which the UE should rate match PDSCH around. The UE rate matches around the union of all resources indicated in the nested bitmaps. Corresponds to L1 parameter 'Resource-set-BWP'. There may be a set of patterns per cell and one per BWP.

rbg-Size

Selection between config 1 and config 2 for RBG size for PDSCH. The NW may only set the field to config2 if resourceAllocation is set to resourceAllocationType0 or dynamicSwitch. Corresponds to L1 parameter 'RBG-size-PDSCH'.

resourceAllocation

Configuration of resource allocation type 0 and resource allocation type 1 for non-fallback DCI Corresponds to L1 parameter 'Resouce-allocation-config'.

sp-ZP-CSI-RS-ResourceSetsToAddModList

AddMod/Release lists for configuring semi-persistent zero-power CSI-RS resource sets. Each set contains a ZP-CSI-RS-ResourceSetId and the IDs of one or more ZP-CSI-RS-Resources (the actual resources are defined in the zp-CSI-RS-ResourceToAddModList). Corresponds to L1 parameter 'ZP-CSI-RS-ResourceSetConfigList'.

tci-StatesToAddModList

A list of Transmission Configuration Indicator (TCI) states indicating a transmission configuration which includes QCL-relationships between the DL RSs in one RS set and the PDSCH DMRS ports.

vrb-ToPRB-Interleaver

Interleaving unit configurable between 2 and 4 PRBs Corresponds to L1 parameter 'VRB-to-PRB-interleaver'. When the field is absent, the UE performs non-interleaved VRB-to-PRB mapping.

zp-CSI-RS-ResourceToAddModList

A list of Zero-Power (ZP) CSI-RS resources used for PDSCH rate-matching. Each resource in this list may be referred to from only one type of resource set, i.e., aperiodic, semi-persistent or periodic.

TABLE 22

PUSCH-Config information element

```
-- ASN1START
-- TAG-PUSCH-CONFIG-START
PUSCH-Config ::=                    SEQUENCE {
    dataScramblingIdentityPUSCH         INTEGER (0..1023)
OPTIONAL,       -- Need S
    txConfig                            ENUMERATED {codebook,
nonCodebook}                                OPTIONAL,       -- Need S
    dmrs-UplinkForPUSCH-MappingTypeA    SetupRelease { DMRS-UplinkConfig
}                                           OPTIONAL,       -- Need M
```

TABLE 22-continued

| PUSCH-Config information element |
|---|

```
        dmrs-UplinkForPUSCH-MappingTypeB          SetupRelease { DMRS-UplinkConfig
}                                                 OPTIONAL,        -- Need M pusch-PowerControl                        PUSCH-PowerControl
OPTIONAL,         -- Need M
        frequencyHopping                          ENUMERATED {intraSlot,
interSlot}                                                         OPTIONAL,      -- Need
S
        frequencyHoppingOffsetLists               SEQUENCE (SIZE (1..4)) OF
INTEGER (1.. maxNrofPhysicalResourceBlocks–1)         OPTIONAL,    -- Need M
        resourceAllocation                        ENUMERATED {
resourceAllocationType0, resourceAllocationType1, dynamicSwitch},
        pusch-TimeDomainAllocationList            SetupRelease { PUSCH-
TimeDomainResourceAllocationList }                 OPTIONAL,       -- Need M
        pusch-AggregationFactor                   ENUMERATED { n2, n4, n8 }
OPTIONAL,        -- Need S
        mcs-Table                                 ENUMERATED {qam256, qam64LowSE}
OPTIONAL,        -- Need S
        mcs-TableTransformPrecoder                ENUMERATED {qam256, qam64LowSE}
OPTIONAL,        -- Need S
        transformPrecoder                         ENUMERATED {enabled, disabled}
OPTIONAL,        -- Need S
        codebookSubset                            ENUMERATED
{fullyAndPartialAndNonCoherent, partialAndNonCoherent,
                                                                    nonCoherent}
OPTIONAL,        -- Cond codebookBased
        maxRank                                   INTEGER (1..4)
OPTIONAL,        -- Cond codebookBased
        rbg-Size                                  ENUMERATED { config2}
OPTIONAL,        -- Need S
        uci-OnPUSCH                               SetupRelease { UCI-OnPUSCH}
OPTIONAL, -- Need M
        tp-pi2BPSK                                ENUMERATED {enabled}
OPTIONAL,        -- Need S
        ...
}
UCI-OnPUSCH ::=                                   SEQUENCE {
    betaOffsets                                   CHOICE {
        dynamic                                       SEQUENCE (SIZE (4)) OF
BetaOffsets,
        semiStatic                                    BetaOffsets
    }
OPTIONAL, -- Need M
    scaling                                       ENUMERATED { f0p5, f0p65, f0p8,
f1 }
}

-- TAG-PUSCH-CONFIG-STOP
-- ASN1STOP
```

TABLE 23

| PUSCH-Config field descriptions |
| --- |
| codebookSubset |
| Subset of PMIs addressed by TPMI, where PMIs are those supported by UEs with maximum coherence capabilities Corresponds to L1 parameter 'ULCodebookSubset'. |
| dataScramblingIdentityPUSCH |
| Identifier used to initiate data scrambling (c_init) for PUSCH. If the field is absent, the UE applies the physical cell ID. |
| dmrs-UplinkForPUSCH-MappingTypeA |
| DMRS configuration for PUSCH transmissions using PUSCH mapping type A (chosen dynamically via PUSCH-TimeDomainResourceAllocation). Only the fields dmrs-Type, dmrs-AdditionalPosition and maxLength may be set differently for mapping type A and B. |
| dmrs-UplinkForPUSCH-MappingTypeB |
| DMRS configuration for PUSCH transmissions using PUSCH mapping type B (chosen dynamically via PUSCH-TimeDomainResourceAllocation). Only the fields dmrs-Type, dmrs-AdditionalPosition and maxLength may be set differently for mapping type A and B. |
| frequencyHopping |
| The value intraSlot enables 'Intra-slot frequency hopping' and the value interSlot enables 'Inter-slot frequency hopping'. If the field is absent, frequency hopping is not configured. Corresponds to L1 parameter 'Frequency-hoppinig-PUSCH'. |
| frequencyHoppingOffsetLists |
| Set of frequency hopping offsets used when frequency hopping is enabled for granted transmission (not msg3) and type 2 Corresponds to L1 parameter 'Frequency-hopping-offsets-set'. |
| maxRank |
| Subset of PMIs addressed by TRIs from 1 to ULmaxRank. Corresponds to L1 parameter 'ULmaxRank'. |
| mcs-Table |
| Indicates which MCS table the UE shall use for PUSCH without transform precoder (see 38.214, section 6.1.4.1). If the field is absent the UE applies the value 64 QAM |
| mcs-TableTransformPrecoder |
| Indicates which MCS table the UE shall use for PUSCH with transform precoding. If the field is absent the UE applies the value 64 QAM |
| pusch-AggregationFactor |
| Number of repetitions for data. Corresponds to L1 parameter 'aggregation-factor-UL'. If the field is absent the UE applies the value 1. |
| pusch-TimeDomainAllocationList |
| List of time domain allocations for timing of UL assignment to UL data. If configured, the values provided herein override the values received in corresponding PUSCH-ConfigCommon for PDCCH scrambled with C-RNTI or CS-RNTI but not for CORESET#0 (see table 9). |
| rbg-Size |
| Selection between configuration 1 and configuration 2 for RBG size for PUSCH. When the field is absent the UE applies the value config1. The NW may only set the field to config2 if resourceAllocation is set to resourceAllocationType0 or dynamicSwitch. Corresponds to L1 parameter 'RBG-size-PUSCH'. |
| resourceAllocation |
| Configuration of resource allocation type 0 and resource allocation type 1 for non-fallback DCI Corresponds to L1 parameter 'Resouce-allocation-config'. |
| tp-pi2BPSK |
| Enables pi/2-BPSK modulation with transform precoding if the field is present and disables it otherwise. |

TABLE 23-continued

| PUSCH-Config field descriptions |
| --- |
| transformPrecoder |
| The UE specific selection of transformer precoder for PUSCH. When the field is absent the UE applies the value msg3-tp. Corresponds to L1 parameter 'PUSCH-tp'. |
| txConfig |
| Whether UE uses codebook based or non-codebook based transmission. Corresponds to L1 parameter 'ulTxConfig'. If the field is absent, the UE transmits PUSCH on one antenna port. |
| betaOffsets |
| Selection between and configuration of dynamic and semi-static beta-offset. If the field is absent or released, the UE applies the value 'semiStatic' and the BetaOffsets according to [BetaOffsets]. Corresponds to L1 parameter 'UCI-on-PUSCH'. |
| scaling |
| Indicates a scaling factor to limit the number of resource elements assigned to UCI on PUSCH. Value f0p5 corresponds to 0.5, value f0p65 corresponds to 0.65, and so on. The value configured herein is applicable for PUCCH with configured grant. Corresponds to L1 parameter 'uci-on-pusch-scaling'. |

In another embodiment, a PDSCH common configuration (PDSCH-ConfigCommon) IE is used to configure UE specific PDSCH parameters, and a PUSCH common configuration (PUSCH-ConfigCommon) IE is used to configure UE specific PUSCH parameters. An example PDSCH-ConfigCommon IE is shown by table 24 and table 25 shows field descriptions for the fields of the PDSCH-ConfigCommon IE. An example PUSCH-ConfigCommon IE is shown by table 26 and table 27 shows field descriptions for the fields of the PUSCH-ConfigCommon IE.

TABLE 24

| PDSCH-ConfigCommon information element |
| --- |
| -- ASN1START<br>-- TAG-PDSCH-CONFIGCOMMON-START<br>PDSCH-ConfigCommon ::=          SEQUENCE {<br>    pdsch-TimeDomainAllocationList      PDSCH-TimeDomainResourceAllocationList      OPTIONAL,   -- Need R<br>    ...<br>}<br>-- TAG-PDSCH-CONFIGCOMMON-STOP<br>-- ASN1STOP |

TABLE 25

| PDSCH-ConfigCommon field descriptions |
| --- |
| pdsch-AllocationListAllocationList<br>List of time-domain configurations for timing of DL assignment to DL data. The configuration applies for PDCCH scrambled with C-RNTI or CS-RNTI but not for CORESET#0 for which the default values in table 3 apply. |

TABLE 26

| PUSCH-Config information element |
| --- |
| -- ASN1START<br>-- TAG-PUSCH-CONFIGCOMMON-START<br>PUSCH-ConfigCommon ::=  SEQUENCE {<br>    groupHoppingEnabledTransformPrecoding  ENUMERATED {enabled} OPTIONAL,  -- Need R<br>    pusch-TimeDomainAllocationList  PUSCH-TimeDomainResourceAllocationList  OPTIONAL,  -- Need R<br>    msg3-DeltaPreamble  INTEGER (-1..6)  OPTIONAL,  -- Need R<br>    p0-NominalWithGrant  INTEGER (-202..24)  OPTIONAL,  -- Need R<br>    ...<br>}<br>-- TAG-PUSCH-CONFIGCOMMON-STOP<br>-- ASN1STOP |

TABLE 27

| PUSCH-ConfigCommon field descriptions |
| --- |
| groupHoppingEnabledTransformPrecoding |
| Sequence-group hopping can be enabled or disabled by means of this cell-specific parameter. Corresponds to L1 parameter 'Group-hopping-enabled-Transform-precoding'. This field is Cell specific |
| msg3-DeltaPreamble |
| Power offset between msg3 and RACH preamble transmission. Actual value = field value * 2 [dB]. Corresponds to L1 parameter 'Delta-preamble-msg3'. |
| p0-NominalWithGrant |
| P0 value for PUSCH with grant (except msg3). Value in dBm. Only even values (step size 2) allowed. Corresponds to L1 parameter 'p0-nominal-pusch-withgrant'. This field is cell specific |
| pusch-TimeDomainAllocationList |
| List of time domain allocations for timing of UL assignment to UL data |

In the examples of tables 18-19 and 22-23, the pdsch-TimeDomainAllocationList field includes a list of time-domain configurations for timing of DL assignment to DL data (e.g., one or more PDSCH-TimeDomainResourceAllocations). Each of these time-domain configurations includes or indicates a slot offset $K_0$, a PDSCH mapping type, and the SLIV as discussed previously with respect to FIG. 1. In various embodiments, the UE 101 uses each of the time-domain configurations to build a time domain resource allocation table (also referred to as an "RRC configured table" or the like) from which the UE 101 determines a PDSCH resource allocation in the time domain based on a row index indicated by a DCI.

Table 28 shows an example PDSCH-TimeDomainResourceAllocation IE, and table 29 shows field descriptions for the fields of the PDSCH-TimeDomainResourceAllocation IE. The PDSCH-TimeDomainResourceAllocation IE is used to configure a time domain relation between the PDCCH and the PDSCH. The PDSCH-TimeDomainResourceAllocationList IE as shown by tables 18 and 22 contains one or more of such PDSCH-TimeDomainResourceAllocations.

TABLE 28

| PDSCH-TimeDomainResourceAllocationList information element |
| --- |
| -- ASN1START<br>-- TAG-PDSCH-TIMEDOMAINRESOURCEALLOCATIONLIST-START<br>PDSCH-TimeDomainResourceAllocationList ::=  SEQUENCE (SIZE(1..maxNrofDL-Allocations)) OF PDSCH-TimeDomainResourceAllocation<br>PDSCH-TimeDomainResourceAllocation ::=  SEQUENCE {<br>    k0  INTEGER(0..32)  OPTIONAL,  -- Need S<br>    mappingType  ENUMERATED {typeA, typeB},<br>    startSymbolAndLength  INTEGER (0..127)<br>}<br>-- TAG-PDSCH-TIMEDOMAINRESOURCEALLOCATIONLIST-STOP<br>-- ASN1STOP |

TABLE 29

PDSCH-TimeDomainResourceAllocation field descriptions k0

The n1 corresponds to the value 1, n2 corresponds to value 2, and so on. Corresponds to L1 parameter 'K0'. When the field is absent the UE applies the value 0.
mappingType PDSCH mapping type.
startSymbolAndLength An index giving valid combinations of start symbol and length (jointly encoded) as start and length indicator (SLIV). The network configures the field so that the allocation does not cross the slot boundary. Corresponds to L1 parameter 'Index-start-len'.

TABLE 41

PUSCH-TimeDomainResourceAllocationList field descriptions k2

Corresponds to L1 parameter 'K2'. When the field is absent the UE applies the value 1 when PUSCH SCS is 15/30 KHz; 2 when PUSCH SCS is 60 KHz and 3 when PUSCH SCS is 120 KHz.
mappingType Mapping type. Corresponds to L1 parameter 'Mapping-type'.
startSymbolAndLength An index giving valid combinations of start symbol and length (jointly encoded) as start and length indicator (SLIV). The network configures the field so that the allocation does not cross the slot boundary.

In this example, the network (e.g., a RAN node 111) indicates in the DL assignment which of the configured time domain allocations the UE 101 is to apply for that DL assignment. The UE 101 determines the bit width of the DCI field based on the number of entries in the PDSCH-TimeDomainResourceAllocationList. In this example, value 0 in the DCI field refers to the first element in this list, value 1 in the DCI field refers to the second element in this list, and so on. For example, the time domain resource assignment field value m of a received DCI provides a row index m+1 to the allocation table where the row corresponding to the row index m+1 refers to the m-th PDSCH-TimeDomainResourceAllocation IE in the PDSCH-TimeDomainResourceAllocationList IE.

In the examples of tables 20-21 and 24-25, the pusch-TimeDomainAllocationList field includes a list of time domain allocations for timing of UL assignment to UL data (e.g., one or more PUSCH-TimeDomainResourceAllocations). Each of these time-domain configurations includes or indicates a slot offset $K_2$, a PUSCH mapping type, and the SLIV as discussed previously with respect to FIG. 1. In various embodiments, the UE 101 uses each of these time-domain configurations to build a time domain resource allocation table (also referred to as an "RRC configured table" or the like) from which the UE 101 determines a PUSCH resource allocation in the time domain based on a row index indicated by a DCI.

Table 40 shows an example PUSCH-TimeDomainResourceAllocation IE, and table 41 shows field descriptions for the fields of the PUSCH-TimeDomainResourceAllocation IE. The PUSCH-TimeDomainResourceAllocation IE is used to configure a time domain relation between PDCCH and PUSCH. The PUSCH-TimeDomainResourceAllocationList IE contains one or more of such PUSCH-TimeDomainResourceAllocations.

In this example, the network (e.g., a RAN node 111) indicates in the UL grant which of the configured time domain allocations the UE 101 is to apply for that UL grant. The UE 101 determines the bit width of the DCI field based on the number of entries in the PUSCH-TimeDomainResourceAllocationList. In this example, value 0 in the DCI field refers to the first element in this list, value 1 in the DCI field refers to the second element in this list, and so on. For example, the time domain resource assignment field value m of a received DCI provides a row index m+1 to the allocation table where the row corresponding to the row index m+1 refers to the m-th PUSCH-TimeDomainResourceAllocation IE in the PUSCH-TimeDomainResourceAllocationList IE.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

According to various embodiments, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 855, SDAP 847, and PDCP 840 of the gNB that controls the

TABLE 40

PDSCH-TimeDomainResourceAllocationList information element

```
-- ASN1START
-- TAG-PUSCH-TIMEDOMAINRESOURCEALLOCATIONLIST-START
PUSCH-TimeDomainResourceAllocationList ::=     SEQUENCE (SIZE(1..mazNrofUL-
Allocations)) OF PUSCH-TimeDomainResourceAllocation
PUSCH-TimeDomainResourceAllocation ::=    SEQUENCE {
    k2                                    INTEGER(0..32)
OPTIONAL,    -- Need S
    mappingType                           ENUMERATED {typeA, typeB},
    startSymbolAndLength                  INTEGER (0..127)
}
-- TAG-PUSCH-TIMEDOMAINRESOURCEALLOCATIONLIST-STOP
-- ASN1STOP
``` operation of one or more gNB-DUs, and the gNB-DUs of the gNB 111 may each host the RLC 830, MAC 820, and PHY 810 of the gNB 111.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise Elementary Procedures (EPs). An NG-AP EP may be a unit of interaction between the NG-RAN node 111 and the AMF 321. The NG-AP 863 services may comprise two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based, in part, on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 710. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIGS. 9-11 show example procedures 900-1100, respectively, in accordance with various embodiments. For illustrative purposes, the various operations of processes 900-1100 is described as being performed by UEs 101 of FIG. 1 or elements thereof (e.g., components discussed with regard to platform 500 of FIG. 5), or a RAN node 111 of FIG. 1 or elements thereof (e.g., components discussed with regard to infrastructure equipment 400 of FIG. 4). Additionally, the various messages/signaling communicated between the UE 101 and RAN node 111 may be sent/received over the various interfaces discussed herein with respect to FIGS. 1-8, and using the various mechanisms discussed herein including those discussed herein with respect to FIGS. 1-8. While particular examples and orders of operations are illustrated FIGS. 9-11, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 9 depicts an example time domain table configuration process 900 and an allocation table building process 912 according to various embodiments. Processes 900 and 912 may be performed by the UE 101. Process 900 begins at operation 903 where the UE 101 receives an RRC message that includes a PDSCH and/or PUSCH configuration, such as those discussed previously with regard to tables 18-29. At operation 906, the UE 101 determines whether the configuration included in the RRC message includes a time domain resource allocation (TDRA) list, for example, the PDSCH-TimeDomainResourceAllocationList IE or the PUSCH-TimeDomainResourceAllocationList IE discussed previously with regard to tables 26-29.

If at operation 906 the UE 101 determines that the configuration does not include a TDRA list, then the UE 101 proceeds to operation 909 to generate or otherwise use a default allocation table. For example, when the PDSCH-TimeDomainResourceAllocationList IE is not included in the configuration, the UE 101 may use one of default PDSCH time domain allocation A, B, C according to tables 3-5, respectively. As shown by table 3, the particular default PDSCH time domain allocation to be used may be based on, inter alia, type of RNTI included or otherwise associated with the PDSCH, the PDCCH search space, the SS/PDCH block and CORESET multiplexing pattern, and/or some other suitable parameters. In another example, when the PUSCH-TimeDomainResourceAllocationList IE is not included in the configuration, the UE 101 may use one of default PUSCH time domain allocation A according to table 10 or 10. As shown by table 9, the particular default PUSCH time domain allocation to be used may be based on, inter alia, type of RNTI included or otherwise associated with the PUSCH, the PDCCH search space, and/or some other suitable parameters.

If at operation 906 the UE 101 determines that the configuration does include a TDRA list, then the UE 101 proceeds to perform the allocation table building process 912 discussed infra. Process 900 ends after performance of operation 909 or the allocation table building process 912.

Referring now to the allocation table building process 912 (on the right side of FIG. 9). Process 912 begins at operation 915 where the UE 101 identifies the TDRA list in the configuration included in the RRC message, and then proceeds to open loop operation 918 to process each TDRA included in the TDRA list (e.g., each PDSCH-TimeDomainResourceAllocation IE in the PDSCH-TimeDomainResourceAllocationList IE or each PUSCH-TimeDomainResourceAllocation IE in the PUSCH-TimeDomainResourceAllocationList IE) in turn.

At operation 921, the UE 101 determines the TDRA parameters included in the TDRA. The TDRA parameters include, inter alia, a slot offset (e.g., $K_0$ for PDSCH or $K_2$ for PUSCH), the SLIV, and the mapping type. At operation 924, the UE 101 adds the TDRA to a corresponding record (or row) in a TDRA table where each TDRA parameter is associated to a respective TDRA field (or column) in the TDRA table. The structure of the TDRA table may be similar to the default allocation tables 3-5 and/or 9-10 discussed previously. In some embodiments, the UE 101 may decode the SLIV to obtain a starting symbol (S) and an allocation length (L), which may then be placed into respective fields (or columns) in the TDRA table. At close loop operation 927, the UE 101 returns back to open loop operation 921 to process a next TDRA in the TDRA list, if any. In addition to adding the TDRA parameters to respective records (or rows), the UE 101 may also add a row index to each record (or row) that corresponds to the order in which the TDRA is processed, for example, the first TDRA to be processed may have a row index of 1, a second TDRA to be processed would have a row index of 2, and so forth. If there are no more TDRAs in the TDRA list, then the UE 101 returns back to process 900.

FIG. 10 shows an example physical shared channel slot determination process 1000 according to various embodiments. Process 1000 may be performed by the UE 101 to determine a slot, slot starting symbol, and allocation length in which to receive a PDSCH or in which to transmit a PUSCH. Process 1000 begins at operation 1003 where the UE 101 receives a DCI that schedules transmission (Tx) or reception (Rx) of a physical shared channel (e.g., a Rx of a PDSCH or Tx of a PUSCH). At operation 1006 the UE 101 identifies an index row in the DCI, which may be, for example, a value of a time domain allocation field of the DCI. At operation 1009, the UE 101 identifies a row of the allocation table (e.g., the table build or identified according to process 900 of FIG. 9) that corresponds to the index row. At operation 1012, the UE 101 identifies TDRA parameters of the identified row, which may include for example, a slot offset, starting symbol (S), allocation length (L), and mapping type.

At operation 1015, the UE 101 determines whether the identified starting symbol (S) and allocation length (L) is a valid combination. The validity of the S and L combination may be based on the type of physical shared channel that is scheduled and the mapping type. As examples, the valid S and L combinations for PDSCH are shown by table 1 supra and the valid S and L combinations for PUSCH are shown by table 7 supra. If at operation 1015 the UE 101 determines that the S and L combination is not a valid combination, then the UE 101 proceeds to operation 1024 to discard the allocation or otherwise not Tx or Rx the physical shared channel. If at operation 1015 the UE 101 determines that the S and L combination is a valid combination, then the UE 101 proceeds to operation 1018 to determine a slot, a starting symbol with respect to a start of the slot, and an allocation length. At operation 1021, the UE 101 controls Rx or Tx of physical shared channel in the time domain allocation determined at operation 1018. Process 1000 ends after performance of operation 1021 or operation 1024.

FIG. 11 depicts an example time domain allocation configuration process 1100 according to various embodiments. Process 1100 may be performed by a RAN node 111 to configure the UE 101 with an appropriate time domain allocation table, and to schedule Tx or Rx of a physical shared channel such as the PDSCH or PUSCH. Process 1100 begins at operation 1103 where the RAN node 111 generate an RRC message to at least include a configuration to indicate an allocation table to be used for determining time domain resource allocations for transmitting PUSCHs or receiving PDSCHs. For example, the configuration could the PDSCH-Config IE or PDSCH-ConfigCommon IE for configuring an appropriate PDSCH time allocation table using the PDSCH-TimeDomainResourceAllocationList IE, and/or the configuration could the PUSCH-Config IE or PUSCH-ConfigCommon IE for configuring an appropriate PUSCH time allocation table using the PUSCH-TimeDomainResourceAllocationList IE. In another example, the PDSCH-Config IE or PDSCH-ConfigCommon IE may not include the PDSCH-TimeDomainResourceAllocationList IE to indicate that a default PDSCH time allocation table should be used, and/or the PUSCH-Config IE or PUSCH-ConfigCommon IE may not include the PUSCH-TimeDomainResourceAllocationList IE to indicate that a default PUSCH time allocation table should be used. At operation 1106, the RAN node 111 transmits the RRC message to the UE 101, and the UE 101 creates or uses the PDSCH and/or PUSCH tables as discussed previously with respect to FIG. 9.

At operation 1109, the RAN node 111 generates a DCI to at least include a time domain resource assignment field to indicate a row index of the allocation table configured at operations 1103-1106. At operation 1112, the RAN node 111 transmits the DCI to the UE 101, which is then decoded by the UE 101. The UE 101 determines the slot, starting symbol, and allocation length in which to Tx or Rx the PUSCH or PDSCH as discussed previously with respect to FIG. 10. Process 1100 ends after performance of operation 1112.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes an integrated circuit (IC) to be implemented in a user equipment (UE), the IC arranged to: determine, based on a time domain resource field of downlink control information (DCI), a starting symbol relative to a start of a slot in which a physical downlink shared channel (PDSCH) scheduled by the DCI is to be received and an allocation length, wherein the allocation length is a number of consecutive symbols counting from the starting symbol, and wherein a combination of the starting symbol and the allocation length is based on a PDSCH mapping type to be assumed for reception of the PDSCH; and control receipt of the PDSCH based on the starting symbol and the allocation length.

Example 2 includes the IC of example 1 and/or some other examples herein, wherein the time domain resource field indicates a row index, and the IC is arranged to: identify, in a row corresponding to the row index, a slot offset, the PDSCH mapping type, a slot offset, and a start and length indicator (SLIV), wherein the SLIV is to indicate the starting symbol and the allocation length.

Example 3 includes the IC of example 2 and/or some other examples herein, wherein the PDSCH mapping type is either a mapping type A or a mapping type B.

Example 4 includes the IC of example 3 and/or some other examples herein, wherein, when the PDSCH mapping type is the mapping type A, the allocation length is any number from three to fourteen, and the starting symbol is one of zero, one, two, or three.

Example 5 includes the IC of examples 3-4 and/or some other examples herein, wherein, when the PDSCH mapping type is the mapping type B, the allocation length is either two, four, or seven symbols, and the starting symbol is any number from zero to twelve.

Example 6 includes the IC of examples 3-5 and/or some other examples herein, wherein the combination of the starting symbol and the allocation length is any number from three to fourteen when the PDSCH mapping type is the mapping type A, and the combination of the starting symbol and the allocation length is any number from two to fourteen when the PDSCH mapping type is the mapping type B.

Example 7 includes the IC of examples 2-6 and/or some other examples herein, wherein the IC is arranged to: determine the allocation length (L) and the starting symbol (S) from the SLIV, wherein if (L−1)≤7, then SLIV=14·(L−1)+S, and if (L−1)>7, then SLIV=14·(14−L+1)+(14−1−S), wherein 0<L≤14−S.

Example 8 includes the IC of examples 2-7 and/or some other examples herein, wherein the IC is arranged to: identify, based on a received Radio Resource Control (RRC) message, a time domain allocation list information element (IE) comprising one or more time domain allocation IEs, wherein each time domain allocation IE of the one or more time domain allocation IEs includes a slot offset field, a SLIV field, and a mapping type field; and generate a time domain resource allocation table to include one or more rows corresponding to the one or more time domain allocation IEs such that each row of the one or more rows includes a corresponding slot offset field, mapping type field, a starting symbol field and an allocation length field, wherein the starting symbol and the allocation length fields of each row are based on the SLIV field of a respective time domain allocation IE.

Example 9 includes the IC of example 1 and/or some other examples herein, wherein the PDSCH is a first PDSCH, the slot is a first slot, the starting symbol is a first starting symbol, and the allocation length is a first allocation length, and the IC is arranged to: determine, based on another time domain resource field of another DCI, a second starting symbol relative to a start of a second slot in which another PDSCH scheduled by the other DCI is to be received and a second allocation length, wherein the second allocation length has a same number of consecutive symbols as the first allocation length, and wherein the second slot is a next consecutive slot in time after the first slot without a gap therebetween.

Example 10 includes the IC of example 1 and/or some other examples herein, wherein the IC is arranged to: determine the combination of the starting symbol and the allocation length such that the combination of the starting symbol and the allocation length does not cross a slot boundary of the slot.

Example 11 includes an integrated circuit (IC) to be implemented in a user equipment (UE), the IC arranged to: determine, based on a time domain resource field of downlink control information (DCI), a starting symbol relative to a start of a slot in which a physical uplink shared channel (PUSCH) scheduled by the DCI is to be transmitted and an allocation length, wherein the allocation length is a number of consecutive symbols counting from the starting symbol, and wherein a combination of the starting symbol and the allocation length is based on a PUSCH mapping type to be assumed for the transmission of the PUSCH; and control transmission of the PUSCH based on the starting symbol and the allocation length.

Example 12 includes the IC of example 11 and/or some other examples herein, wherein the time domain resource field indicates a row index, and the IC is arranged to: identify, in a row corresponding to the identified row index, a slot offset, the PUSCH mapping type, a slot offset, and a start and length indicator (SLIV), wherein the SLIV is to indicate the starting symbol and the allocation length.

Example 13 includes the IC of example 12 and/or some other examples herein, wherein the PUSCH mapping type is either a mapping type A or a mapping type B.

Example 14 includes the IC of example 13, wherein, when the PUSCH mapping type is the mapping type A, the allocation length is any number from four to fourteen, and the starting symbol is zero.

Example 15 includes the IC of examples 13-14 and/or some other examples herein, wherein, when the PUSCH mapping type is the mapping type B, the allocation length is any number from one to fourteen, and the starting symbol is any number from zero to thirteen.

Example 16 includes the IC of examples 13-15 and/or some other examples herein, wherein the combination of the starting symbol and the allocation length is any number from three to fourteen when the PUSCH mapping type is the mapping type A, and the combination of the starting symbol and the allocation length is any number from two to fourteen when the PUSCH mapping type is the mapping type B.

Example 17 includes the IC of example 12 and/or some other examples herein, wherein the IC is arranged to: determine the allocation length (L) and the starting symbol (S) from the SLIV, wherein if (L−1)≤7, then SLIV=14·(L−1)+S, and if (L−1)>7, then SLIV=14·(14−L+1)+(14−1−S), wherein 0<L≤14−S.

Example 18 includes the IC of examples 12-17 and/or some other examples herein, wherein the IC is arranged to: identify, based on a received Radio Resource Control (RRC) message, a time domain allocation list information element (IE) comprising one or more time domain allocation IEs, wherein each time domain allocation IE of the one or more time domain allocation IEs includes a slot offset field, a SLIV field, and a mapping type field; and generate a time domain resource allocation table to include one or more rows corresponding to the one or more time domain allocation IEs such that each row of the one or more rows includes a corresponding slot offset field, mapping type field, a starting symbol field and an allocation length field, wherein the starting symbol and the allocation length fields of each row are based on the SLIV field of a respective time domain allocation IE.

Example 19 includes the IC of examples 11-18 and/or some other examples herein, wherein the PDSCH is a first PUSCH, the slot is a first slot, the starting symbol is a first starting symbol, and the allocation length is a first allocation length, and wherein the IC is arranged to: determine, based on another time domain resource field of another DCI, a second starting symbol relative to a start of a second slot in which another PUSCH scheduled by the other DCI is to be received and a second allocation length, wherein the second allocation length has a same number of consecutive symbols as the first allocation length, and wherein the second slot is a next consecutive slot in time after the first slot without a gap therebetween.

Example 20 includes the IC of examples 11-19 and/or some other examples herein, wherein the IC is arranged to: determine the combination of the starting symbol and the allocation length such that the combination of the starting symbol and the allocation length does not cross a slot boundary of the slot.

Example 21 includes the IC of any of examples 1-20 and/or some other examples herein, wherein the UE supports up to eight layers for downlink transmission, wherein a maximum number of layers supported by the UE for a serving cell is a maximum number of layers for one transport block (TB).

Example 22 includes the IC of any of example 21 and/or some other examples herein, wherein the maximum number of layers supported by the UE for the serving cell for a TB such that limited buffer rate matching (LBRM) is applied based on four layers.

Example 23 includes the IC of any of examples 21-22 and/or some other examples herein, wherein the IC is arranged to: select one or more bits for a low density parity check (LDPC) rate matching procedure based on the maximum number of layers for one TB supported by the UE.

Example 24 includes the IC of any of examples 1-23 and/or some other examples herein, wherein the IC is a System-on-Chip (SoC), System-in-Package (SiP), or a Multi-Chip Package (MCP), and wherein the IC includes processor circuitry coupled with memory circuitry.

Example 25 includes an apparatus to be implemented in a Next Generation Radio Access Network (NG-RAN) node, the apparatus comprising: processor circuitry arranged to generate downlink control information (DCI) to at least include a time domain resource assignment field, wherein the time domain resource assignment field is to include a value to indicate a row index of an allocation table, and wherein a row in the allocation table corresponding to the row index at least defines a slot offset, a mapping type, and a start and length indicator (SLIV) or directly a start symbol and an allocation length; and interface circuitry coupled with the processor circuitry, the interface circuitry arranged to provide the DCI to a radio front end module (RFEM) for transmission to a user equipment (UE).

Example 26 includes the apparatus of example 25 and/or some other examples herein, wherein the DCI is to schedule a Physical Downlink Shared Channel (PDSCH), the mapping type is a PDSCH mapping type to be assumed for reception of the PDSCH, the PDSCH mapping type is either a PDSCH mapping type A or a PDSCH mapping type B, and wherein: when the PDSCH mapping type is the mapping type A, the allocation length is any number from three to fourteen, and the starting symbol is one of zero, one, two, or three; and when the PDSCH mapping type is the mapping type B, the allocation length is either two, four, or seven symbols, and the starting symbol is any number from zero to twelve.

Example 27 includes the apparatus of example 25 and/or some other examples herein, wherein the DCI is to schedule a Physical Uplink Shared Channel (PUSCH), the mapping type is a PUSCH mapping type to be assumed for transmission of the PUSCH, the PUSCH mapping type is either a PUSCH mapping type A or a PUSCH mapping type B, and wherein: when the PUSCH mapping type is the mapping type A, the allocation length is any number from four to fourteen, and the starting symbol is zero; and when the PUSCH mapping type is the mapping type B, the allocation length is any number from one to fourteen, and the starting symbol is any number from zero to thirteen.

Example 28 includes the apparatus of examples 25-27 and/or some other examples herein, wherein: the processor circuitry is arranged to generate a Radio Resource Control (RRC) message to include a configuration, wherein the configuration is to include a time domain allocation list (TimeDomainAllocationList) information element (IE), wherein the TimeDomainAllocationList IE includes one or more time domain allocation (TimeDomainAllocation) IEs, wherein each TimeDomainAllocation IE of the one or more TimeDomainAllocation IEs is to correspond to a row in the allocation table; and the interface circuitry arranged to provide the RRC message to the RFEM for transmission to the UE prior to transmission of the DCI.

Example 29 includes the apparatus of examples 25-28 and/or some other examples herein, wherein: the processor circuitry is arranged to generate an RRC message to include a configuration, wherein the configuration is to not include a TimeDomainAllocationList IE to indicate to use a default allocation table based on a type of Radio Network Temporary Identifier (RNTI) to be included with a transmission scheduled by the DCI; and the interface circuitry arranged to provide the RRC message to the RFEM for transmission to the UE prior to transmission of the DCI.

Example 30 includes the apparatus of any of examples 25-29 and/or some other examples herein, wherein the apparatus is a System-on-Chip (SoC), System-in-Package (SiP), or a Multi-Chip Package (MCP).

Example 31 includes a method comprising: determining or causing to determine, based on a time domain resource field of downlink control information (DCI), a starting symbol relative to a start of a slot in which a physical downlink shared channel (PDSCH) scheduled by the DCI is to be received and an allocation length, wherein the allocation length is a number of consecutive symbols counting from the starting symbol, and wherein a combination of the starting symbol and the allocation length is based on a PDSCH mapping type to be assumed for reception of the PDSCH, and controlling receipt of the PDSCH based on the starting symbol and the allocation length.

Example 32 includes the method of example 31 and/or some other examples herein, wherein the time domain resource field indicates a row index, and the method comprises: identifying or causing to identify, in a row corresponding to the row index, a slot offset, the PDSCH mapping type, a slot offset, and a start and length indicator (SLIV), wherein the SLIV is to indicate the starting symbol and the allocation length.

Example 33 includes the method of example 32 and/or some other examples herein, wherein the PDSCH mapping type is either a mapping type A or a mapping type B.

Example 34 includes the method of example 33 and/or some other examples herein, wherein, when the PDSCH mapping type is the mapping type A, the allocation length is any number from three to fourteen, and the starting symbol is one of zero, one, two, or three.

Example 35 includes the method of examples 33-34 and/or some other examples herein, wherein, when the PDSCH mapping type is the mapping type B, the allocation length is either two, four, or seven symbols, and the starting symbol is any number from zero to twelve.

Example 36 includes the method of examples 33-35 and/or some other examples herein, wherein the combination of the starting symbol and the allocation length is any number from three to fourteen when the PDSCH mapping type is the mapping type A, and the combination of the starting symbol and the allocation length is any number from two to fourteen when the PDSCH mapping type is the mapping type B.

Example 37 includes the method of examples 32-36 and/or some other examples herein, wherein the method comprises: determining or causing to determine the allocation length (L) and the starting symbol (S) from the SLIV, wherein: if $(L-1) \leq 7$, then $SLIV=14 \cdot (L-1)+S$, and if $(L-1) > 7$, then $SLIV=14 \cdot (14-L+1)+(14-1-S)$, wherein $0 < L \leq 14-S$.

Example 38 includes the method of examples 32-37 and/or some other examples herein, wherein the method comprises: identifying or causing to identify, based on a received Radio Resource Control (RRC) message, a time domain allocation list information element (IE) comprising one or more time domain allocation IEs, wherein each time domain allocation IE of the one or more time domain allocation IEs includes a slot offset field, a SLIV field, and a mapping type field; and generating or causing to generate a time domain resource allocation table to include one or more rows corresponding to the one or more time domain allocation IEs such that each row of the one or more rows includes a corresponding slot offset field, mapping type field, a starting symbol field and an allocation length field, wherein the starting symbol and the allocation length fields of each row are based on the SLIV field of a respective time domain allocation IE.

Example 39 includes the method of example 31 and/or some other examples herein, wherein the PDSCH is a first PDSCH, the slot is a first slot, the starting symbol is a first starting symbol, and the allocation length is a first allocation length, and the method comprising: determining or causing to determine, based on another time domain resource field of another DCI, a second starting symbol relative to a start of a second slot in which another PDSCH scheduled by the other DCI is to be received and a second allocation length, wherein the second allocation length has a same number of consecutive symbols as the first allocation length, and wherein the second slot is a next consecutive slot in time after the first slot without a gap therebetween.

Example 40 includes the method of example 31 and/or some other examples herein, wherein the method comprises: determining or causing to determine the combination of the starting symbol and the allocation length such that the combination of the starting symbol and the allocation length does not cross a slot boundary of the slot.

Example 41 includes a method comprising: determining or causing to determine, based on a time domain resource field of downlink control information (DCI), a starting symbol relative to a start of a slot in which a physical uplink shared channel (PUSCH) scheduled by the DCI is to be transmitted and an allocation length, wherein the allocation length is a number of consecutive symbols counting from the starting symbol, and wherein a combination of the starting symbol and the allocation length is based on a PUSCH mapping type to be assumed for the transmission of the PUSCH; and controlling transmission of the PUSCH based on the starting symbol and the allocation length.

Example 42 includes the method of example 41 and/or some other examples herein, wherein the time domain resource field indicates a row index, and the method comprises: identifying or causing to identify, in a row corresponding to the identified row index, a slot offset, the PUSCH mapping type, a slot offset, and a start and length indicator (SLIV), wherein the SLIV is to indicate the starting symbol and the allocation length.

Example 43 includes the method of example 42 and/or some other examples herein, wherein the PUSCH mapping type is either a mapping type A or a mapping type B.

Example 44 includes the method of example 43, wherein, when the PUSCH mapping type is the mapping type A, the allocation length is any number from four to fourteen, and the starting symbol is zero.

Example 45 includes the method of examples 43-44 and/or some other examples herein, wherein, when the PUSCH mapping type is the mapping type B, the allocation length is any number from one to fourteen, and the starting symbol is any number from zero to thirteen.

Example 46 includes the method of examples 43-45 and/or some other examples herein, wherein the combination of the starting symbol and the allocation length is any number from three to fourteen when the PUSCH mapping type is the mapping type A, and the combination of the starting symbol and the allocation length is any number from two to fourteen when the PUSCH mapping type is the mapping type B.

Example 47 includes the method of example 42 and/or some other examples herein, wherein the method comprises: determining or causing to determine the allocation length (L) and the starting symbol (S) from the SLIV, wherein: if $(L-1) \leq 7$, then $SLIV=14 \cdot (L-1)+S$, and if $(L-1)>7$, then $SLIV=14 \cdot (14-L+1)+(14-1-S)$, wherein $0<L \leq 14-S$.

Example 48 includes the method of examples 42-47 and/or some other examples herein, wherein the method comprises: identifying or causing to identify, based on a received Radio Resource Control (RRC) message, a time domain allocation list information element (IE) comprising one or more time domain allocation IEs, wherein each time domain allocation IE of the one or more time domain allocation IEs includes a slot offset field, a SLIV field, and a mapping type field; and generating or causing to generate a time domain resource allocation table to include one or more rows corresponding to the one or more time domain allocation IEs such that each row of the one or more rows includes a corresponding slot offset field, mapping type field, a starting symbol field and an allocation length field, wherein the starting symbol and the allocation length fields of each row are based on the SLIV field of a respective time domain allocation IE.

Example 49 includes the method of examples 41-48 and/or some other examples herein, wherein the PDSCH is a first PUSCH, the slot is a first slot, the starting symbol is a first starting symbol, and the allocation length is a first allocation length, and wherein the method comprises: determining or causing to determine, based on another time domain resource field of another DCI, a second starting symbol relative to a start of a second slot in which another PUSCH scheduled by the other DCI is to be received and a second allocation length, wherein the second allocation length has a same number of consecutive symbols as the first allocation length, and wherein the second slot is a next consecutive slot in time after the first slot without a gap therebetween.

Example 50 includes the method of examples 41-49 and/or some other examples herein, wherein the method comprises: determining or causing to determine the combination of the starting symbol and the allocation length such that the combination of the starting symbol and the allocation length does not cross a slot boundary of the slot.

Example 51 includes the method of any of examples 31-50 and/or some other examples herein, wherein the UE supports up to eight layers for downlink transmission, wherein a maximum number of layers supported by the UE for a serving cell is a maximum number of layers for one transport block (TB).

Example 52 includes the method of any of example 51 and/or some other examples herein, wherein the maximum number of layers supported by the UE for the serving cell for a TB such that limited buffer rate matching (LBRM) is applied based on four layers.

Example 53 includes the method of any of examples 51-52 and/or some other examples herein, wherein the method comprises: selecting or causing to select one or more bits for a low density parity check (LDPC) rate matching procedure based on the maximum number of layers for one TB supported by the UE.

Example 54 includes the method of any of examples 31-53 and/or some other examples herein, wherein the method is to be performed by a System-on-Chip (SoC), System-in-Package (SiP), or a Multi-Chip Package (MCP) implemented in a user equipment (UE).

Example 55 includes a method comprising: generating or causing to generate downlink control information (DCI) to at least include a time domain resource assignment field, wherein the time domain resource assignment field is to include a value to indicate a row index of an allocation table, and wherein a row in the allocation table corresponding to the row index at least defines a slot offset, a mapping type, and a start and length indicator (SLIV) or directly a start symbol and an allocation length; and controlling transmission of the DCI to a user equipment (UE).

Example 56 includes the method of example 55 and/or some other examples herein, wherein the DCI is to schedule a Physical Downlink Shared Channel (PDSCH), the mapping type is a PDSCH mapping type to be assumed for reception of the PDSCH, the PDSCH mapping type is either a PDSCH mapping type A or a PDSCH mapping type B, and wherein: when the PDSCH mapping type is the mapping type A, the allocation length is any number from three to fourteen, and the starting symbol is one of zero, one, two, or three; and when the PDSCH mapping type is the mapping type B, the allocation length is either two, four, or seven symbols, and the starting symbol is any number from zero to twelve.

Example 57 includes the method of example 55 and/or some other examples herein, wherein the DCI is to schedule a Physical Uplink Shared Channel (PUSCH), the mapping type is a PUSCH mapping type to be assumed for transmission of the PUSCH, the PUSCH mapping type is either a PUSCH mapping type A or a PUSCH mapping type B, and wherein: when the PUSCH mapping type is the mapping type A, the allocation length is any number from four to fourteen, and the starting symbol is zero; and when the PUSCH mapping type is the mapping type B, the allocation length is any number from one to fourteen, and the starting symbol is any number from zero to thirteen.

Example 58 includes the method of examples 55-57 and/or some other examples herein, wherein the method comprises.

generating or causing to generate a Radio Resource Control (RRC) message to include a configuration, wherein the configuration is to include a time domain allocation list (TimeDomainAllocationList) information element (IE), wherein the TimeDomainAllocationList IE includes one or more time domain allocation (TimeDomainAllocation) IEs, wherein each TimeDomainAllocation IE of the one or more TimeDomainAllocation IEs is to correspond to a row in the allocation table; and controlling transmission of the RRC message to the UE prior to transmission of the DCI.

Example 59 includes the method of examples 55-58 and/or some other examples herein, wherein the method comprises: generating or causing to generate an RRC message to include a configuration, wherein the configuration is to not include a TimeDomainAllocationList IE to indicate to use a default allocation table based on a type of Radio Network Temporary Identifier (RNTI) to be included with a transmission scheduled by the DCI; and controlling transmission of the RRC message to the RFEM for transmission to the UE prior to transmission of the DCI.

Example 60 includes the method of any of examples 55-59 and/or some other examples herein, wherein the method is to be performed by a System-on-Chip (SoC), System-in-Package (SiP), or a Multi-Chip Package (MCP) implemented in a Next Generation Radio Access Network (NG-RAN) node.

Example 61 may include an apparatus comprising means to perform one or more elements of a method described in or related to any of examples 1-60, or any other method or process described herein.

Example 62 may include one or more non-transitory computer-readable media comprising instructions to cause an electronic device, upon execution of the instructions by one or more processors of the electronic device, to perform one or more elements of a method described in or related to any of examples 1-60, or any other method or process described herein.

Example 63 may include an apparatus comprising logic, modules, or circuitry to perform one or more elements of a method described in or related to any of examples 1-60, or any other method or process described herein.

Example 64 may include a method, technique, or process as described in or related to any of examples 1-60, or portions or parts thereof.

Example 65 may include an apparatus comprising: one or more processors and one or more computer-readable media comprising instructions that, when executed by the one or more processors, cause the one or more processors to perform the method, techniques, or process as described in or related to any of examples 1-60, or portions thereof.

Example 66 may include a signal as described in or related to any of examples 1-60, or portions or parts thereof.

Example 67 includes a packet, frame, segment, protocol data unit (PDU), or message as described in or related to any of examples 1-60, or portions or parts thereof, or otherwise described in the present disclosure Example 68 may include a signal in a wireless network as shown and described herein. Example 69 may include a method of communicating in a wireless network as shown and described herein. Example 70 may include a system for providing wireless communication as shown and described herein. Example 71 may include a device for providing wireless communication as shown and described herein. Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), ASICs, FPDs (e.g., FPGAs, PLDs, CPLDs, HCPLDs, a structured ASICs, or a programmable SoCs, DSPs, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data, and/or any other device capable of executing or otherwise operating computer-executable instructions, such as program code, software modules, and/or functional processes.

As used herein, the term "module" refers to one or more independent electronic circuits packaged onto a circuit board, SoC, SiP, etc., configured to provide a basic function within a computer system.

As used herein, the term "module" refers to, be part of, or include an FPD, ASIC, a processor (shared, dedicated, or group) and/or memory (shared, dedicated, or group), etc., that execute one or more software or firmware programs, a combinational logic circuit, and/or other suitable components that provide the described functionality.

As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

As used herein, the term "device" refers to a physical entity embedded inside, or attached to, another physical entity in its vicinity, with capabilities to convey digital information from or to that physical entity. As used herein, the term "element" refers to a unit that is indivisible at a given level of abstraction and has a clearly defined boundary, wherein an element may be any type of entity. As used herein, the term "controller" refers to an element or entity that has the capability to affect a physical entity, such as by changing its state or causing the physical entity to move. As used herein, the term "entity" refers to (1) a distinct component of an architecture or device, or (2) information transferred as a payload. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources.

As used herein, the term "architecture" refers to a fundamental organization of a system embodied in its components, their relationships to one another, and to an environment, as well as to the principles guiding its design and evolution.

As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

As used herein, the term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the terms "instantiate," "instantiation," and the like refers to the creation of an instance, and an "instance" refers to a concrete occurrence of an object, which may occur, for example, during execution of program code.

As used herein, a "database object", "data object", or the like refers to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" refers to a resource hosted by a remote entity (e.g., a cloud computing service) and accessible over a network. The term "on-device resource" refers to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" refers to compute, storage, and/or network resources provided by virtualization infrastructure to an application, such as a multi-access edge applications. The term "information element" refers to a structural element containing one or more fields. The term "field" refers to individual contents of an information element, or a data element that contains content.

For the purposes of the present document, the abbreviations listed in table 42 may apply to the examples and embodiments discussed herein.

TABLE 42

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AMF | Access and Mobility Management Function |
| AN | Access Network |
| AP | Application Protocol, Antenna Port, Access Point |
| API | Application Programming Interface |
| ARQ | Automatic Repeat Request |
| AS | Access Stratum |
| ASN.1 | Abstract Syntax Notation One |
| AUSF | Authentication Server Function |
| BS | Base Station |
| BSR | Buffer Status Report |
| BW | Bandwidth |
| BWP | Bandwidth Part |
| CA | Carrier Aggregation, Certification Authority |
| CC | Component Carrier, Country Code, Cryptographic Checksum |
| CCA | Clear Channel Assessment |
| CCE | Control Channel Element |
| CCCH | Common Control Channel |
| CDMA | Code-Divisioni Multiple Access |
| CI | Cell Identity |
| CID | Cell-ID (e.g., positioning method) |
| CM | Connection Management, Conditional Mandatory |

TABLE 42-continued

| | |
|---|---|
| CMAS | Commercial Mobile Alert Service |
| CORESET | Control Resource Set |
| CP | Control Plane, Cyclic Prefix, Connection Point |
| CPICH | Common Pilot Channel |
| CQI | Channel Quality Indicator |
| CPU | CSI processing unit, Central Processing Unit |
| CRAN | Cloud Radio Access Network, Cloud RAN |
| CRC | Cyclic Redundancy Check |
| CRI | Channel-State Information Resource Indicator, CSI-RS Resource Indicator |
| C-RNTI | Cell RNTI |
| CS | Circuit Switched |
| CS-RNTI | Configured Scheduling RNTI |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| D2D | Device-to-Device |
| DC | Dual Connectivity, Direct Current |
| DCI | Downlink Control Information |
| DL | Downlink |
| DL-SCH | Downlink Shared Channel |
| DM-RS, DMRS | Demodulation Reference Signal |
| DN | Data network |
| DRB | Data Radio Bearer |
| DRS | Discovery Reference Signal |
| DRX | Discontinuous Reception |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| eLAA | enhanced LAA |
| EM | Element Manager |
| eNB | evolved NodeB, E-UTRAN Node B |
| EPC | Evolved Packet Core |
| EPDCCH | enhanced PDCCH, enhanced Physical Downlink Control Cannel |
| EPS | Evolved Packet System |
| EREG | enhanced REG, enhanced resource element groups |
| E-UTRA | Evolved UTRA |
| E-UTRAN | Evolved UTRAN |
| F1AP | F1 Application Protocol |
| F1-C | F1 Control plane interface |
| F1-U | F1 User plane interface |
| FDD | Frequency Division Duplex |
| FDM | Frequency Division Multiplex |
| FDMA | Frequency Division Multiple Access |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GSM | Global System for Mobile Communications, Groupe Spécial Mobile |
| GTP | GPRS Tunnelling Protocol |

TABLE 42-continued

| | |
|---|---|
| GTP-U | GPRS Tunnelling Protocol for User Plane |
| GUMMEI | Globally Unique MME Identifier |
| GUTI | Globally Unique Temporary UE Identity |
| HARQ | Hybrid ARQ, Hybrid Automatic Repeat Request |
| HANDO, HO | Handover |
| HFN | HyperFrame Number |
| HLR | Home Location Register |
| HPLMN | Home PLMN |
| HSS | Home Subscriber Server |
| HTTP | Hyper Text Transfer Protocol |
| HTTPS | Hyper Text Transfer Protocol Secure (https is http/1.1 over SSL, i.e. port 443) |
| ID | Identity, identifier |
| IDFT | Inverse Discrete Fourier Transform |
| IE | Information element |
| IEEE | Institute of Electrical and Electronics Engineers |
| IEI | Information Element Identifier |
| IEIDL | Information Element Identifier Data Length |
| IMSI | International Mobile Subscriber Identity |
| INT-RNTI | Interruption RNTI |
| IoT | Internet of Things |
| IP | Internet Protocol |
| IPsec | IP Security, Internet Protocol Security |
| IR | Infrared |
| IWF | Interworking-Function |
| kB | Kilobyte (1000 bytes) |
| kbps | kilo-bits per second |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBRM | Limited Buffer Rate Matching |
| LBT | Listen Before Talk |
| LDPC | Low density parity check |
| LI | Layer Indicator |
| LLC | Logical Link Control, Low Layer Compatibility |
| LPLMN | Local PLMN |
| LTE | Long-Term Evolution |
| LWA | LTE-WLAN aggregation |
| LWIP | LTE/WLAN Radio Level Integration with IPsec Tunnel |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MCS | Modulation and Coding Scheme |
| MCS-C-RNTI | Modulation and Coding Scheme-Cell-RNTI |
| MeNB | master eNB |
| MER | Message Error Ratio |
| MIB | Master Information Block, Management Information Base |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MTC | Machine-Type Communications |
| mMTC | massive MTC, massive Machine-Type Communications |
| NACK | Negative Acknowledgement |
| NAS | Non-Access Stratum, Non-Access Stratum layer |
| NEF | Network Exposure Function |
| NF | Network Function |
| NG | Next Generation, Next Gen |
| NGEN-DC | NG-RAN E-UTRA-NR Dual Connectivity |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NW | Network |
| NZP | Non-Zero Power |
| OFDM | Orthogonal Frequency Division Multiplexing |
| OFDMA | Orthogonal Frequency Division Multiple Access |
| OTA | over-the-air |
| P-RNTI | Paging RNTI |
| PBCH | Physical Broadcast Channel |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| P-GW | PDN Gateway |
| PHICH | Physical hybrid-ARQ indicator channel |
| PHY | Physical layer |
| PLMN | Public Land Mobile Network |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group, Precoding resource block group |
| ProSe | Proximity Services, Proximity-Based Service |
| PRS | Positioning Reference Signal |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| RF | Radio Frequency |
| RI | Rank Indicator |
| RIV | Resource indicator value |
| RL | Radio Link |
| RLC | Radio Link Control, Radio Link Control layer |
| RLF | Radio Link Failure |
| RLM | Radio Link Monitoring |
| RLM-RS | Reference Signal for RLM |
| RM | Registration Management |

TABLE 42-continued

| | |
|---|---|
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SDAP | Service Data Adaptation Protocol, Service Data Adaptation Protocol layer |
| SDNF | Structured Data Storage Network Function |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFI-RNTI | Slot format indication RNTI |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SLIV | Start and Length Indicator |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TC-RNTI | Temporary Cell RNTI |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TDRA | Time Domain Resource Allocation |
| TE | Terminal Equipment |
| TEID | Tunnel End Point Identifier |
| TPC | Transmit Power Control |
| TPC-PUCCH-RNTI | Transmit Power Control-PUCCH-RNTI |
| TPC-PUSCH-RNTI | Transmit Power Control-PUSCH-RNTI |
| TPC-SRS-RNTI | Transmit Power Control-SRS-RNTI |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UL-SCH | Uplink Shared Channel |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| V2I | Vehicle-to-Infrastructure |
| V2P | Vehicle-to-Pedestrian |
| V2V | Vehicle-to-Vehicle |
| V2X | Vehicle-to-everything |
| VoIP | Voice-over-IP, Voice-over-Internet Protocol |
| VPLMN | Visited Public Land Mobile Network |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | Expected user RESponse |
| XOR | eXclusive OR |
| ZC | Zadoff-Chu |

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A user equipment (UE), comprising:
radio front end circuitry configured to receive a Radio Resource Control (RRC) message to schedule a Physical Downlink Shared Channel (PDSCH); and
processing circuitry configured to:
identify a row from the RRC message that indexes a corresponding record in a time domain resource allocation (TDRA) table,
identify an entry of the TDRA table that corresponds to the row,
identify a plurality of TDRA parameters from the entry of the TDRA table, the plurality of TDRA parameters including a starting symbol and an allocation length,
determine whether a combination of the starting symbol and the allocation length is a valid combination of parameters,
discard, in response to the combination of the starting symbol and the allocation length not being the valid combination of parameters, the starting symbol and the allocation length,
decode, in response to the combination of the starting symbol and the allocation length being the valid combination of parameters, the plurality of TDRA parameters to identify a slot, the starting symbol with respect to a start of the slot in which the PDSCH is to be received, and the allocation length, and
control, in response to the combination of the starting symbol and the allocation length being the valid combination of parameters, reception of the PDSCH based on the starting symbol and the allocation length.

2. The UE of claim 1, wherein the radio front end circuitry is configured to receive downlink control information (DCI) to schedule the reception of the PDSCH.

3. The UE of claim 2, wherein the processing circuitry is configured to:
identify a value of a time domain allocation field of the DCI; and
identify the row that corresponds to the value of the time domain allocation field.

4. The UE of claim 1, wherein the allocation length indicates a number of consecutive symbols allocated for the PDSCH counted from the starting symbol.

5. The UE of claim 4, wherein the number of consecutive symbols is determined from a start and length indicator (SLIV).

6. The UE of claim 1, wherein the processing circuitry is further configured to determine whether the starting symbol and the allocation length is the valid combination of parameters based on a mapping type of the PDSCH.

7. The UE of claim 6, wherein the valid combination of parameters comprises:
any number from three to fourteen when the mapping type of the PDSCH comprises a mapping type A; or
any number from two to fourteen when the mapping type of the PDSCH comprises a mapping type B.

8. The UE of claim 1, wherein the plurality of TDRA parameters further comprise a slot offset or a mapping type.

9. A method for communicating within a physical shared channel, the method comprising:
receiving, by a user equipment (UE), downlink control information (DCI) to schedule a Physical Downlink Shared Channel (PDSCH);
identifying, by the UE, a value of a time domain allocation field of the DCI that indexes a corresponding record in a time domain resource allocation (TDRA) table;
identifying, by the UE, a row of the TDRA table that corresponds to the value of the time domain allocation field;
identifying, by the UE, a plurality of TDRA parameters from the row of the TDRA table, the plurality of TDRA parameters including a starting symbol and an allocation length;
determining, by the UE, whether a combination of the starting symbol and the allocation length is a valid combination of parameters;
discarding, by the UE in response to the combination of the starting symbol and the allocation length not being the valid combination of parameters, the starting symbol and the allocation length;
decoding, by the UE in response to the combination of the starting symbol and the allocation length being the valid combination of parameters, the one or more TDRA parameters to identify a slot, the starting symbol with respect to a start of the slot in which the PDSCH is to be received and the allocation length indicating a number of consecutive symbols allocated for the PDSCH counted from the starting symbol; and
controlling, by the UE response to the combination of the starting symbol and the allocation length being the valid combination of parameters, reception of the PDSCH based on the starting symbol and the allocation length.

10. The method of claim 9, wherein the receiving comprises receiving the DCI to schedule the reception of the PDCSH.

11. The method of claim 9, wherein the determining comprises determining that the starting symbol and the allocation length is the valid combination of parameters based on a mapping type of the PDSCH.

12. The method of claim 11, wherein the valid combination of parameters comprises:
any number from three to fourteen when the mapping type of the PDSCH comprises a mapping type A; or any number from two to fourteen when the mapping type of the PDSCH comprises a mapping type B.

13. The method of claim 9, wherein the plurality of TDRA parameters further comprise a slot offset or a mapping type.

14. The method of claim 9, wherein the number of consecutive symbols is determined from a start and length indicator (SLIV).

15. A user equipment (UE), comprising:
a memory that stores a time domain resource allocation (TDRA) table having a plurality of entries that are arranged as a plurality of rows; and
processing circuitry configured to:
identify a row from among the plurality of rows of the TDRA table from downlink control information (DCI) scheduling a Physical Downlink Shared Channel (PDSCH),
identify a plurality of TDRA parameters from an entry from among the plurality of entries of the TDRA table that corresponds to the row, the plurality of TDRA parameters including a starting symbol and an allocation length,
determine whether a combination of the starting symbol and the allocation length is a valid combination of parameters,
discard, in response to the combination of the starting symbol and the allocation length not being the valid combination of parameters, the starting symbol and the allocation length,
decode, in response to the combination of the starting symbol and the allocation length being the valid combination of parameters, the plurality of TDRA parameters to identify a slot, the starting symbol with respect to a start of the slot in which the PDSCH is to be received, and the allocation length, and
control, in response to the combination of the starting symbol and the allocation length being the valid combination of parameters, reception of the PDSCH based on the starting symbol and the allocation length.

16. The UE of claim 15, wherein the processing circuitry is configured to:
identify a value of a time domain allocation field of the DCI, and
identify the row that corresponds to the value of the time domain allocation field.

17. The UE of claim 15, wherein the allocation length indicates a number of consecutive symbols allocated for the PDSCH counted from the starting symbol.

18. The UE of claim 15, wherein the processing circuitry is further configured to determine whether the starting symbol and the allocation length is the valid combination of parameters based on a mapping type of the PDSCH.

19. The UE of claim 18, wherein the valid combination of parameters comprises:
any number from three to fourteen when the mapping type of the PDSCH comprises a mapping type A; or
any number from two to fourteen when the mapping type of the PDSCH comprises a mapping type B.

20. The UE of claim 15, wherein the plurality of TDRA parameters further comprise a slot offset or a mapping type.

* * * * *